(12) United States Patent
Freedman et al.

(10) Patent No.: US 10,511,378 B2
(45) Date of Patent: Dec. 17, 2019

(54) HYBRID ANALOG/DIGITAL BEAM FORMING RAIN FADE MITIGATION

(71) Applicant: RKF Engineering Solutions LLC, Bethesda, MD (US)

(72) Inventors: Jeffrey Freedman, Laurel, MD (US); Michael Mandell, Farmington Hills, MI (US); Phil Rubin, Washington, DC (US); Ted Kaplan, North Potomac, MD (US); David Milliner, Potomac, MD (US); David Marshack, Bethesda, MD (US); Erik Halvorson, Vienna, VA (US)

(73) Assignee: RKF Engineering Solutions LLC, Bethesda, MD (US)

( * ) Notice: Subject to any disclaimer, the term of this patent is extended or adjusted under 35 U.S.C. 154(b) by 0 days.

(21) Appl. No.: 16/159,125

(22) Filed: Oct. 12, 2018

(65) Prior Publication Data
US 2019/0115975 A1 Apr. 18, 2019

Related U.S. Application Data

(60) Provisional application No. 62/571,574, filed on Oct. 12, 2017.

(51) Int. Cl.
| | |
|---|---|
| *H04B 7/185* | (2006.01) |
| *H01Q 1/28* | (2006.01) |
| *H01Q 15/16* | (2006.01) |
| *H04B 7/19* | (2006.01) |
| *H01Q 3/24* | (2006.01) |
| *H01Q 19/17* | (2006.01) |

(Continued)

(52) U.S. Cl.
CPC ............ *H04B 7/18515* (2013.01); *H01Q 1/28* (2013.01); *H01Q 1/288* (2013.01); *H01Q 3/247* (2013.01); *H01Q 15/16* (2013.01); *H01Q 19/17* (2013.01); *H01Q 21/0025* (2013.01); *H01Q 25/002* (2013.01); *H04B 7/19* (2013.01)

(58) Field of Classification Search
CPC ...... H04B 7/18515; H04B 7/19; H01Q 15/16; H01Q 1/28
See application file for complete search history.

(56) References Cited

U.S. PATENT DOCUMENTS

| | | |
|---|---|---|
| 6,421,528 B1 | 7/2002 | Rosen et al. |
| 7,844,687 B1 | 11/2010 | Gelvin et al. |

(Continued)

FOREIGN PATENT DOCUMENTS

| | | |
|---|---|---|
| WO | WO 2010/144918 | 12/2010 |
| WO | WO-2011161198 | 12/2011 |
| WO | WO 2014/001837 | 1/2014 |

OTHER PUBLICATIONS

International Search Report and Written Opinion in International Application No. PCT/US2017/54292, dated Dec. 14, 2017, 10 pages.

(Continued)

*Primary Examiner* — Lewis G West
(74) *Attorney, Agent, or Firm* — Fish & Richardson P.C.

(57) ABSTRACT

Fade conditions are determined for each gateway in gateway clusters of a set of gateway clusters. A proper subset of the gateway clusters is selected based on the fade conditions determined for each gateway. A beam plan is determined based on the proper subset of the gateway clusters. The beam plan is executed.

24 Claims, 21 Drawing Sheets

(51) Int. Cl.
*H01Q 21/00* (2006.01)
*H01Q 25/00* (2006.01)

(56) References Cited

U.S. PATENT DOCUMENTS

| | | |
|---|---|---|
| 8,743,914 B1 | 6/2014 | Jensen |
| 9,379,806 B1 | 6/2016 | Mandell et al. |
| 9,450,666 B1 | 9/2016 | Freedman et al. |
| 9,647,735 B2 | 5/2017 | Sajedieh et al. |
| 9,748,989 B1 | 8/2017 | Freedman et al. |
| 9,848,370 B1* | 12/2017 | Freedman ............ H04B 17/102 |
| 9,967,792 B2* | 5/2018 | Chan ................... H04W 36/30 |
| 10,211,912 B2* | 2/2019 | Tani ..................... H04B 7/2041 |
| 2008/0204319 A1 | 8/2008 | Niu et al. |
| 2010/0042716 A1 | 2/2010 | Farajidana et al. |
| 2010/0194629 A1 | 8/2010 | Craig et al. |
| 2013/0039445 A1 | 2/2013 | Hwang |
| 2013/0301454 A1 | 11/2013 | Seol et al. |
| 2014/0111373 A1 | 4/2014 | Puzella et al. |
| 2015/0188623 A1* | 7/2015 | Angeletti ............ H04B 7/2041 455/13.3 |
| 2015/0304885 A1 | 10/2015 | Jalali |
| 2016/0261325 A1 | 9/2016 | Ko et al. |
| 2016/0277990 A1 | 9/2016 | Chan |
| 2016/0352012 A1 | 12/2016 | Foo |
| 2018/0019800 A1* | 1/2018 | Buer .................. H04B 7/18534 |
| 2018/0123674 A1 | 5/2018 | Freedman et al. |
| 2019/0028166 A1 | 1/2019 | Freedman |

OTHER PUBLICATIONS

PCT International Search Report in International Application No. PCT/US2018/055586, dated Dec. 26, 2018, 12 pages.

Tsai et al. "Analysis and evaluation of a multiple gateway traffic-distribution scheme for gateway clusters," National Taiwan University. May 2006. [retrieved on Dec. 4, 2018]. Retrieved from the Internet:<URL:http://ntur.lib.ntu.edu.tw/bitstream/246246/142128/1/24.pdf>. entire document, 12 pages.

PCT International Search Report and Written Opinion in International Application No. PCT/US17/54334, dated Apr. 2, 2019, 9 pages.

PCT International Search Report and Written Opinion in International Application No. PCT/US1754292, dated Apr. 2, 2019, 5 pages.

* cited by examiner

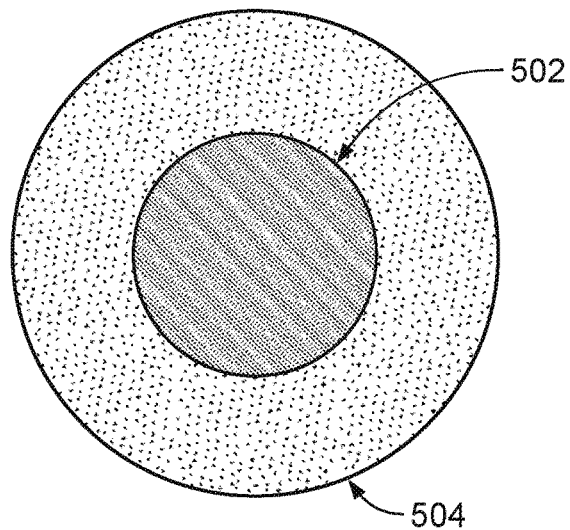
FIG. 5
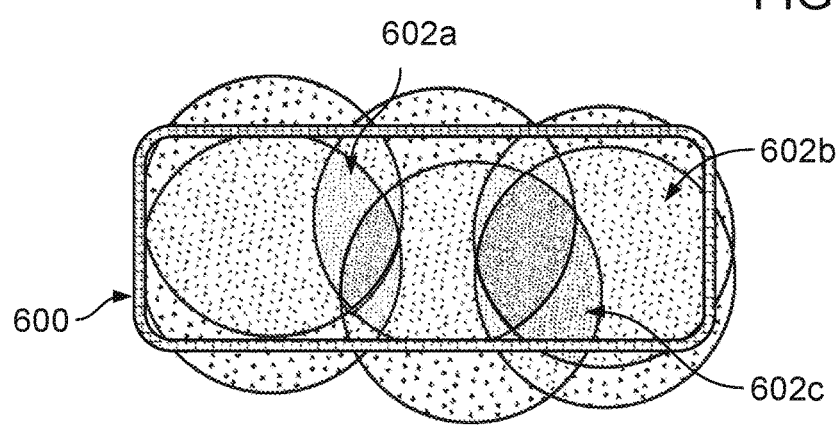
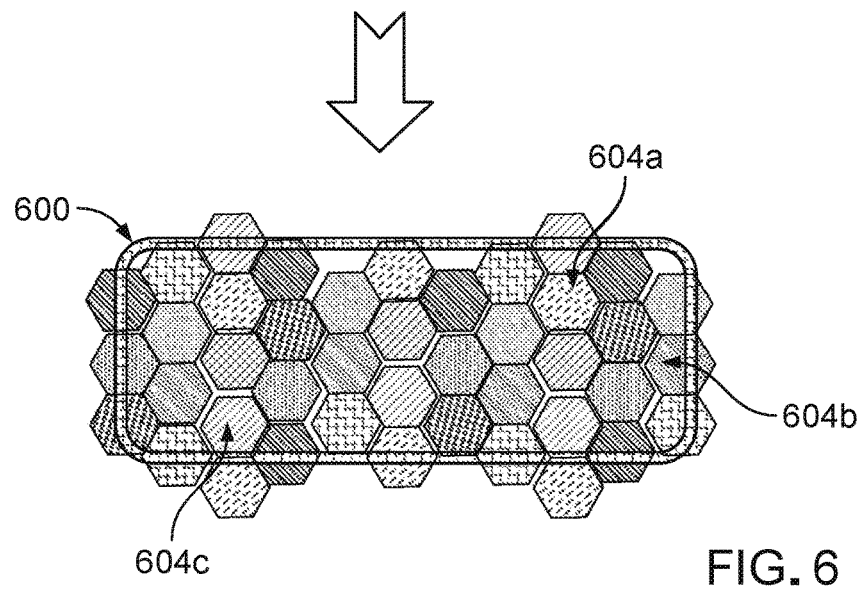
FIG. 6

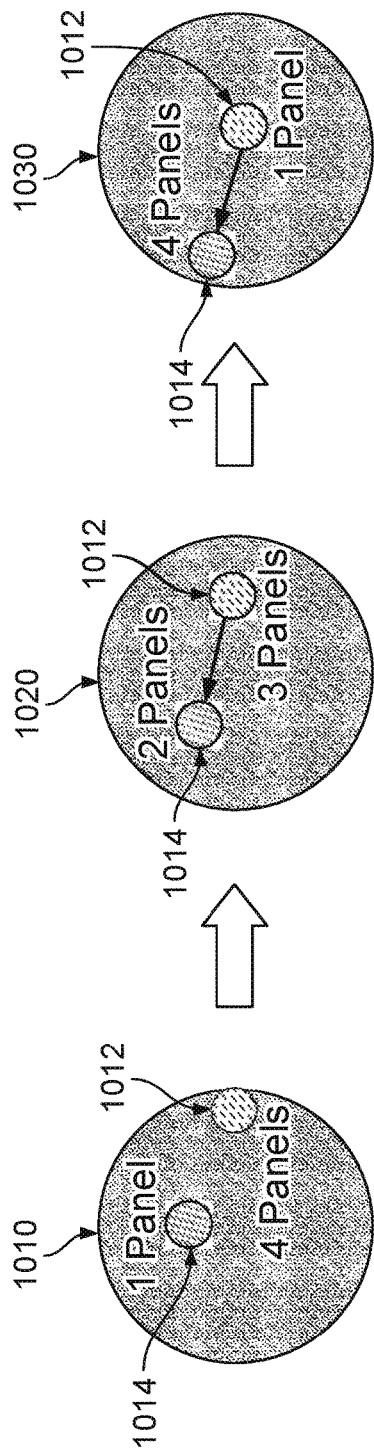
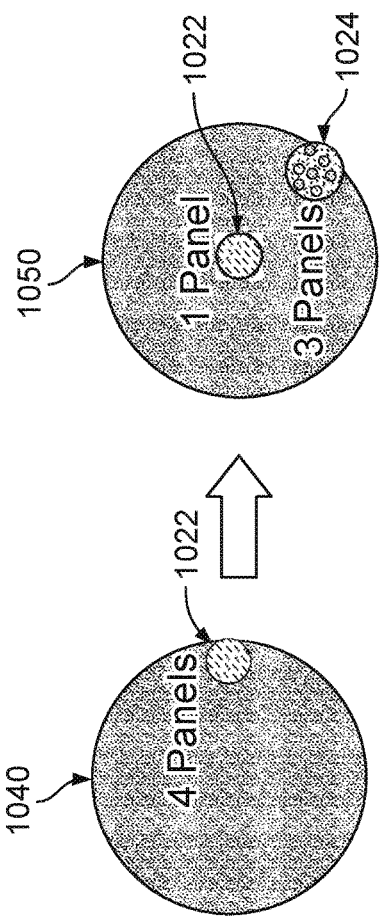
FIG. 10A
FIG. 10B

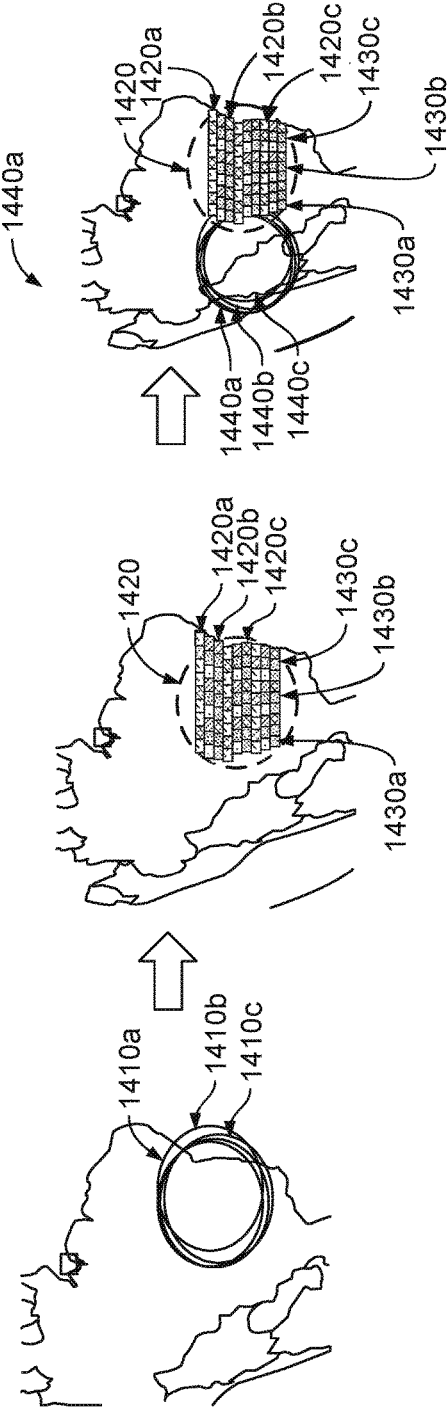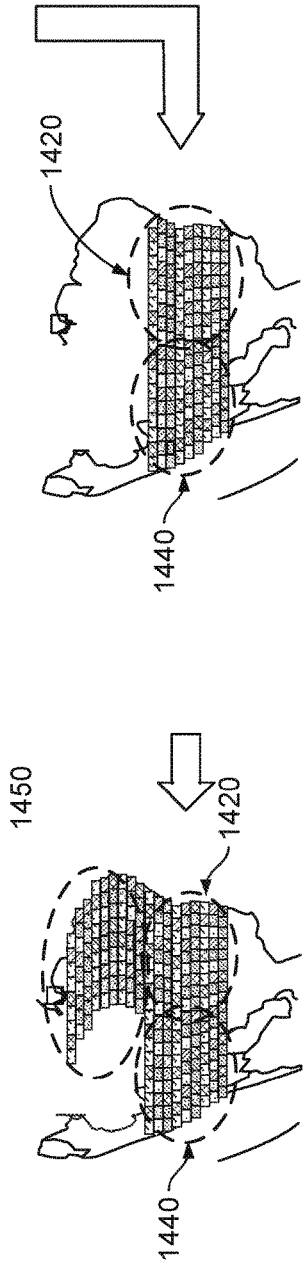

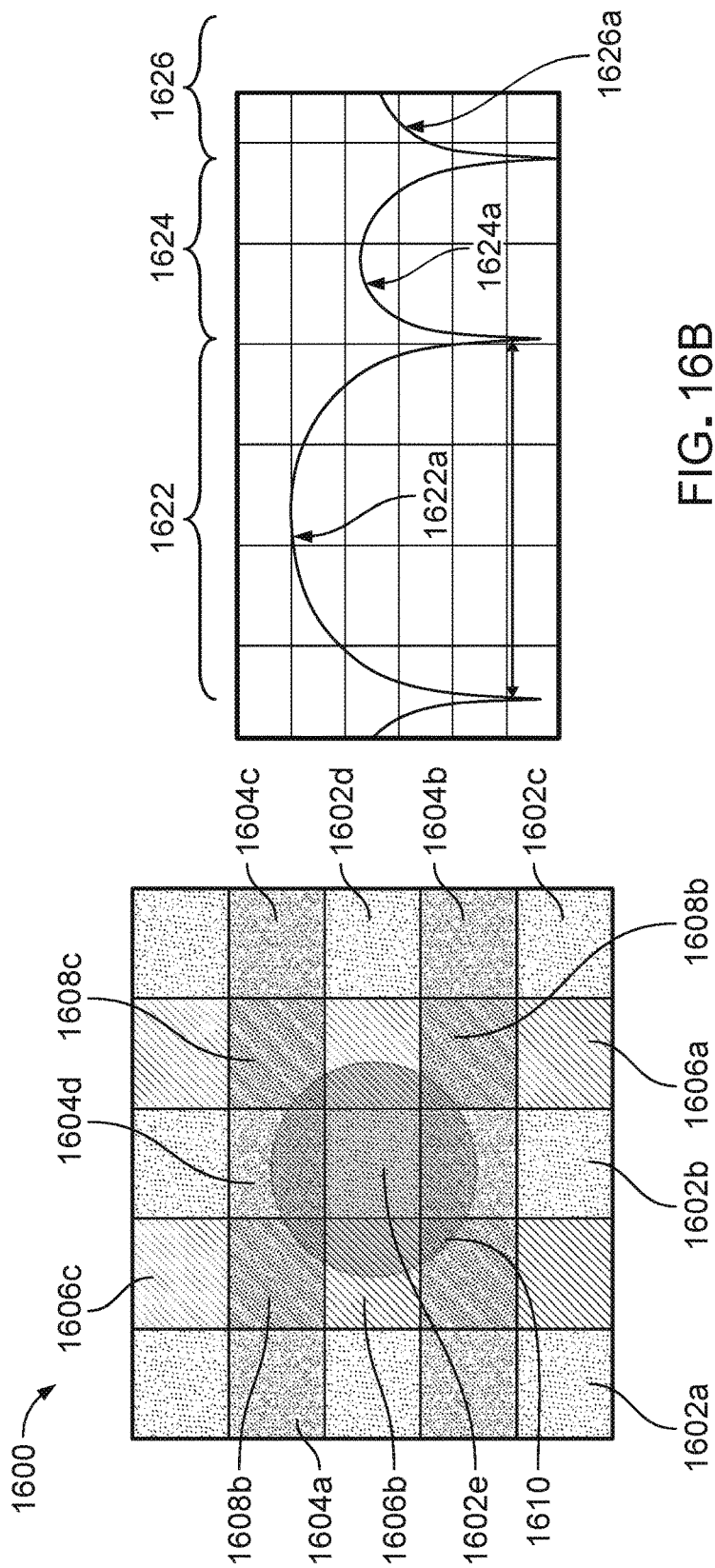

HYBRID ANALOG/DIGITAL BEAM FORMING RAIN FADE MITIGATION

CROSS-REFERENCE TO RELATED APPLICATIONS

This application claims the benefit of U.S. Provisional Application No. 62/571,574, filed Oct. 12, 2017, the contents of which is incorporated by reference in its entirety.

TECHNICAL FIELD

The following disclosure relates generally to a hybrid analog/digital beamforming communications system.

BACKGROUND

Some communications systems, e.g., a satellite communications system, provide multiple communication beams that connect diverse terrestrial regions. In some cases, a target area is covered using analog communications beams. Alternatively, in some cases, a target area is covered using digital communications beams.

SUMMARY

The following disclosure describes a communications system for hybrid analog/digital beamforming to generate a set of communication beams (also referred to as "beams") to cover a target area. The system includes a beamforming apparatus for generating hybrid analog/digital beams, where beamforming refers to techniques to form beams to establish communications channels. In some implementations, the beamforming apparatus is a spacecraft, e.g., a satellite, a drone, an airplane, or an aerial platform. In other implementations, the beamforming apparatus is a ground-based apparatus, e.g., an antenna tower. The following sections describe the hybrid analog/digital beamforming in the context of a satellite. However, the techniques are also applicable to other beamforming apparatus, e.g., other forms of space-based beamforming devices or terrestrial beamforming structures.

In some implementations, a satellite that performs hybrid analog/digital beamforming includes multiple antenna radiating elements (also known as "feeds") and associated phase shifters for forming analog beams. The satellite includes processing circuitry, comprising one or more beamformer processors, that control the feeds to form the analog beams. The feeds are divided into groups among hardware structures called "panels," also referred to as analog beamformers. The processing circuitry controls the panels to form one or more analog beams per panel, with the analog beams from some or all the panels providing coverage in a region in the target area, generating a cluster. The beamformer processors in the processing circuitry also form digital beams using digital beamforming coefficients stored in tables. The processing circuitry forms one or more digital beams in the cluster by phase and gain combining the analog beams in the cluster. The hybrid analog/digital beams, e.g., digital beams that are generated by combining the analog beams in a cluster, are also referred to as hybrid beams.

Hybrid beams are accordingly digital beams that are generated in a hierarchical manner—first by forming analog beams, and then by combining the analog beams to form the digital beams that correspond to the hybrid beams. In contrast, pure digital beams are formed by directly combining the phase, delay, or amplitude (or gain) of the feeds using digital coefficients—there is no intermediate formation of analog beams. Pure digital beams can be created in any region. In contrast, in hybrid beamforming, the digital beamformers in the spacecraft are constrained to create the hybrid beams, i.e., the digital beams, within the coverage areas of the underlying analog beams. The analog beamformers combine the analog beams to provide the contours of the coverage areas in which the digital beams are generated.

The satellite in the communications system divides a target coverage area into multiple regions. The processing circuitry in the satellite provides, in a region, analog beams formed by one or more panels to create a cluster, and generates one or more digital beams for the cluster by combining the corresponding analog beams, as noted above. In some implementations, the footprints of the analog beams overlap to some degree, e.g., either partially or completely. In such cases, digital beams are formed by combining the overlapping analog beams. In some implementations, the footprints of at least some of the analog beams are non-overlapping. In such cases, at least some digital beams are formed by combining separate groups of the analog beams, which can include overlapping analog beams.

After forming the hybrid beams in a region, the processing circuitry repeats the process in a neighboring region, until all the regions are addressed, thereby covering the target area with the hybrid beams. The processing circuitry arranges the hybrid beams in a cluster in rows and columns. In some implementations, the processing circuitry horizontally shifts some rows, or vertically shift some columns, or both, to conform to the boundaries of the cluster. Additionally or alternatively, the processing circuitry stretches or contracts hybrid beams in some rows, or some columns, or both, to conform to the boundaries of the cluster. In some implementations, the processing circuitry horizontally shifts some rows, or vertically shift some columns, or both, in a cluster such that the rows and columns of hybrid beams in the cluster are adjacent to the rows and columns of hybrid beams in a neighboring cluster, for no gap in coverage.

In attempting to satisfy communication requirements, the communications system may also attempt to mitigate fade conditions. Fade conditions are conditions that cause signals between the satellite and the ground to fade. For example, if it is raining at a particular location, a signal that normally may be received at 50 dBW may be attenuated by −5 dBW by the rain so that it is only received at 45 dBW. The satellite communications system may attempt to mitigate for fade conditions to thereby prevent degradation of communications service quality that can occur as a result of the faded signals. For example, attenuation of a signal by rain may reduce the data capacity available through the signal as the signal may experience more interference.

To ensure the satisfaction of quality of service when there are changing fade conditions, the satellite communications system may attempt to mitigate fade conditions by permanently increasing the power of all transmitted signals. However, this approach may increase the transmission power capacity requirements of the satellite communications system and waste power when no fade conditions are present. Instead of permanently increasing the power of all transmitted signals, the satellite communications system may attempt to dynamically mitigate fade conditions.

The satellite communications system may dynamically mitigate fade conditions by selecting different gateway clusters to use among multiple gateway clusters, where each gateway cluster includes multiple gateways located at different geographical locations and selection is based on estimating fade conditions at the gateways in the gateway clusters. Each of the gateways in each gateway cluster may be covered by an analog beam and different digital beams. When the satellite communications system selects to start using a spare gateway cluster due to fade conditions, the analog beams that covered the gateways in the gateway cluster no longer being used are moved to cover the gateways in the spare gateway cluster and relative locations of the digital beams within the gateway cluster no long being used are realigned to match the geographical locations of the gateways in the spare gateway cluster.

By dynamically mitigating for fade conditions, the satellite communications system may permit the use of satellites that have a lower total power output capacity and may reduce the power usage of the satellites, among other advantages.

One innovative aspect of the subject matter described in this specification is embodied in a method that includes the actions of determining fade conditions for each gateway in gateway clusters of a set of gateway clusters, selecting a proper subset of the gateway clusters based on the fade conditions determined for each gateway, determining a beam plan based on the proper subset of the gateway clusters, and executing the beam plan.

The foregoing and other embodiments can each optionally include one or more of the following features, alone or in combination. For instance, in some aspects the gateways in each gateway cluster are operable to form an analog beam with a satellite where at least some of the analog beams in each gateway cluster at least partially overlap and combine to form a digital beam. In certain aspects, selecting a proper subset of the gateway clusters based on the fade conditions determined for each gateway includes determining an aggregate data capacity for each of the gateway clusters based on the fade conditions and selecting the gateway clusters with aggregate data capacities that are the highest out of the set of gateway clusters. In some implementations, selecting a proper subset of the gateway clusters based on the fade conditions determined for each gateway includes determining a number of gateways that satisfies a fade threshold for each gateway cluster and selecting the gateway clusters with the most number of gateways in the gateway cluster that satisfy the fade threshold.

In certain aspects, selecting a proper subset of the gateway clusters based on the fade conditions determined for each gateway includes not selecting a gateway cluster in the set of gateway clusters for inclusion in the proper subset, where the gateway cluster that is not selected is currently being used to transmit data with a satellite and selecting a gateway cluster in the set of gateway clusters for inclusion in the proper subset, where the gateway cluster that is selected is not currently being used to transmit data with a satellite. In some aspects, determining fade conditions for each gateway in gateway clusters of a set of gateway clusters includes determining a strength of signals between each gateway and the satellite and determining the fade conditions from the strength of the signals. In some implementations, determining a beam plan based on the proper subset of the gateway clusters includes determining beamforming coefficients for each of the gateways in the proper subset of the gateway clusters based on the gateways in the proper subset of the gateway clusters.

In certain aspects, executing the beam plan includes providing, from the satellite the beam plan to the gateways. In some aspects selecting a proper subset of the gateway clusters based on the fade conditions determined for each gateway is performed by a satellite. In some implementations, selecting a proper subset of the gateway clusters based on the fade conditions determined for each gateway is performed by a central operations center.

Implementations of the above techniques include methods, systems and non-transitory machine-readable media. One such method performs the above-described actions. One such non-transitory machine-readable medium stores instructions that are executable by one or more processors and that, when executed, are configured to cause the one or more processors to perform the above-described actions. One such system comprises one or more spacecraft, such as one or more satellites, or ground-based beamforming apparatus, such as one or more antenna towers, each of which includes one or more processors and instructions stored in machine-readable media that, when executed by the one or more processors, are configured to cause the one or more processors to perform one or more of the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 5 presents a comparative illustration of examples of coverage areas provided by a pure analog beam and overlapping analog beams formed using a hybrid beamformer.

FIG. 6 illustrates an example of hybrid beamforming to fully cover a non-circular shaped region.

FIGS. 10A and 10B illustrate examples of dynamic resource transfer in hybrid beamforming to provide communications coverage to multiple regions.

FIGS. 14A-14E illustrate an example of covering regions in a target area by hybrid beamforming using groups of clusters.

FIGS. 16A-16C provide comparative examples of communications coverage using different cluster frequencies and shared cluster frequencies.

Like reference symbols in different figures indicate like elements.

DETAILED DESCRIPTION

Figure 1:
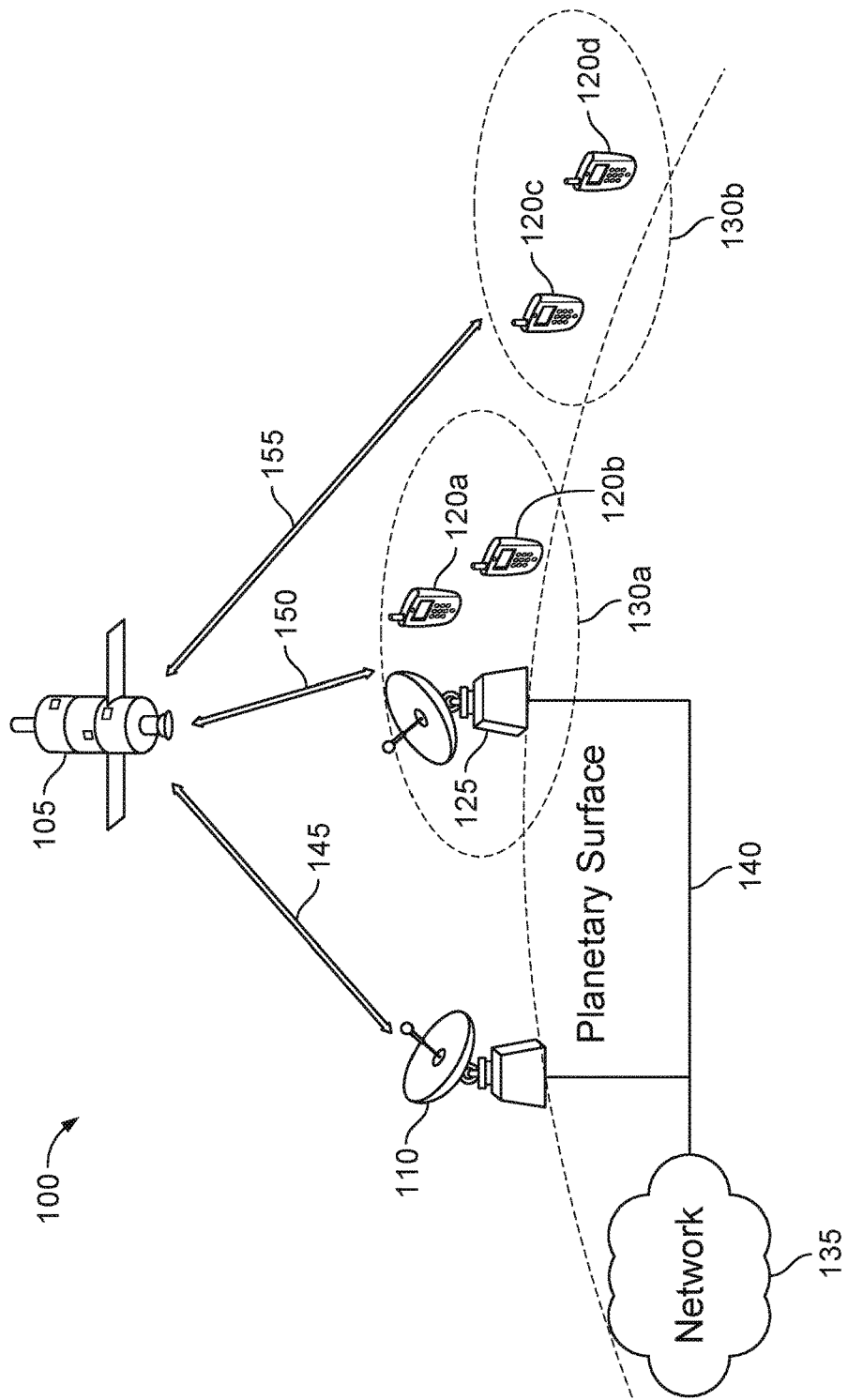
FIG. 1 illustrates an exemplary communications system that is used for hybrid beamforming.

In a communications system, e.g., a satellite communications system, a satellite can transmit signals to or receive signals from terrestrial devices. For example, the satellite may receive a signal from a gateway, e.g., a ground station that communicates with the satellite and with a terrestrial network, and then broadcast the signal to one or more ground terminals, e.g., satellite dishes or antennas along with their connected devices in customer locations. In some cases, the satellite uses multiple feeds, in, for example, a phased array antenna or as part of a reflector antenna, to form one or more analog beams for communicating with terrestrial devices.

A radiating element or feed refers to a resonating structure that is designed to transmit or receive electromagnetic energy in a frequency band (e.g., a microwave frequency band). A beam can be specified by a set of real or complex beam coefficients applied across the feeds of a satellite for analog beamforming, or to digital signals for digital beamforming. The beam coefficients may be determined based on satisfying a required minimum average power over a region covered by the beam.

Beamforming can be accomplished onboard a satellite by constructing a beamforming network behind the feed array using one or more beamformer processors on board the satellite. A beamformer processor, which includes dedicated integrated circuit (IC) chips, computes coefficients for each intended beam, which include analog coefficients for analog beams and digital coefficients for digital beams. For each feed, the processor applies the corresponding beam coefficient to a signal that is transmitted by the feed. The processor sends the signal to the feed through a high power amplifier (HPA) connected to the feed. In this manner, the processor applies the computed beam coefficients to the feeds to generate the desired beams for transmission of signals to terrestrial coverage regions.

In an analog beamforming satellite, a signal stream is divided among each of the feeds. The one or more beamformer processors form analog beams by adjusting the relative phase and/or gain (or amplitude) of each signal path routed to each feed to thereby enable the energy radiated by each transmitting feed to be coherently combined to create a beam pattern composed of one or more beams. The same approach can also be used in the receive direction where the received signals from each receiving feed are coherently combined to create the beam pattern. To form an analog beam, each feed uses a phase shifter. A feed can form multiple analog beams with multiple phase shifters, requiring a different phase shifter for each analog beam.

The number of analog beams formed by a satellite depends on various factors, including the number of feeds and the number of phase shifters per feed. Since every beam requires one phase shifter per feed, the hardware needed to generate a large number of analog beams (e.g., in the order of hundreds or thousands) can become prohibitively high—e.g. in terms of increased weight of the satellite, higher cost, or higher complexity. Accordingly, the number of analog beams that can be formed by a satellite is often limited due to hardware constraints.

Digital beamforming, which is not limited by phase shifter constraints, can be used to create a large number of digital beams. However, to generate digital beams, a satellite uses analog-to-digital (A/D) and digital-to-analog (D/A) converters for each feed to convert associated signals into the digital domain. The satellite performs A/D conversion of the analog signal streams for the feeds to the digital domain, and uses the beamformer processor for combining the phase and gain of the digital signals, relying on table lookup of digital beam coefficients that are stored in memory. Then digital signals are then converted back to analog using D/A conversion, and these are transmitted as separate signals.

Although digital beamforming does not use phase shifters, since an A/D converter and a D/A converter is used for every single feed, this introduces a significant amount of hardware circuitry, e.g., wires going into a beamformer processor and going out of the processor to connect the feeds. The hardware needs for digital beamforming to support a large number of feeds (e.g., in the order of hundreds or thousands) can therefore also become prohibitively high—e.g. in terms of increased weight of the satellite, higher cost, or higher complexity.

In some implementations, hybrid analog/digital beamforming, which combines analog beamforming with digital beamforming and is interchangeably also referred to as hybrid beamforming, is used to support both a large number of feeds and a large number of beams, while overcoming the constraints associated individually with analog or digital beamforming for achieving these objectives. As described in greater detail in the following sections, hybrid beamforming allows analog beamformer hardware (e.g., panels) to support a large number of elements and digital beamformer processing circuitry to create a large number of beams. In doing so, with the same analog and digital beamforming hardware, hybrid beamforming provides a multiplicative increase in bandwidth and coverage area and higher edge of coverage (EOC) gains in the beams, compared to using analog beamforming or digital beamforming individually.

Hybrid beamforming further allows customizing the beam footprints to provide coverage for regions of various shapes and sizes. Digital beams are iteratively generated in neighboring regions and adjusted in various directions relative to one another to provide complete coverage of a target area comprising the regions, while maximizing the communications capacity in the target area.

FIG. 1 illustrates an exemplary communications system 100 that is used for hybrid beamforming. The communications system 100 includes a satellite 105 connected through satellite channels to gateways 110 and 125, and ground terminals 120a, 120b, 120c and 120d, which are located on a planetary surface, e.g., the surface of the Earth. Although the illustrated example of communications system 100 shows one satellite and a limited number of gateways and ground terminals, various implementations can include different numbers of satellites, gateways and ground terminals without loss of generality. The following sections describe the planetary surface with respect to the Earth's surface. However, the techniques described are also applicable to other planetary surfaces.

The satellite 105 transmits data to, and receives data, from the gateways 110, 125, and ground terminals 120a, 120b, 120c and 120d. Gateway 125 and ground terminals 120a and 120b are within a terrestrial region 130a that is covered by a formed beam. Ground terminals 120c and 120d are within a terrestrial region 130b that is covered by another formed beam. That is, gateway 125 and ground terminals 120a and 120b are located within the geographic extent covered by beam 130a, while ground terminals 120c and 120d are located within the geographic extent covered by beam 130b. The gateways 110 and 125 are terrestrially connected to each other and to a terrestrial network 135 through communications link 140.

The satellite 105 can be located at a low earth orbit (LEO), a medium earth orbit (MEO), or a geostationary orbit (GEO) location defined by a longitude. The satellite 105 interconnects the gateway 110, the gateway 125 and the ground terminals 120a, 120b in beam 130a, and the ground terminals 120c, 120d in beam 130b, through satellite communications channels.

The satellite 105 includes multiple antenna radiating elements or feeds to form beams for transmission of information between the satellite 105 and the gateways or ground terminals. The satellite 105 includes one or more beamformer processors to process active signal streams for beamforming. In some implementations, the satellite 105 also includes multiple HPAs that receive the active signal streams from the beamformer processor, and forwards the signal streams with amplification to feeds that are connected to the HPAs. The feeds transmit signals to or receive signals from the gateways 110, 125 and the ground terminals 120a-120d using the formed beams. A beam can encompass one or more gateways (e.g., beam 130a) within its coverage area, or a beam can encompass zero gateways (e.g., 130b).

The beams 130a and 130b are hybrid analog/digital beams formed by the satellite 105. The beams 130a or 130b, or both, are digital beams that are generated by a digital beamformer on board the satellite by combining analog beams generated panels. The digital beams 130a or 130b, or both, are therefore hybrid beams formed within a cluster coverage area of the analog beams. While only two hybrid beams 130a and 130b are shown, more than two beams can be active at a time in various implementations, and any number of ground terminals can be distributed amongst a plurality of beam coverage areas. The number of hybrid beams that can be simultaneously active depends on the number of panels on the satellite used for generating analog beams, within the coverage area of which the digital beams are created. As described in greater detail below, in some implementations, the number of hybrid beams can range between tens to the order of thousands.

In this context, in some implementations, a panel is a hardware structure that provides a surface on which the constituent feeds of the panel are positioned. Each panel can re-orient (e.g., tilt or move) the constituent feeds relative to other panels. In some implementations, a panel is a radiating antenna structure that can form one or more steerable analog beams. A panel is also referred to interchangeably as an analog beamformer, as noted previously.

The following sections describe configurations of the satellite 105 that includes processing circuitry with one or more one or more onboard beamformer processors that control the analog beamformer panels to generate analog beams, and perform digital beamforming on the analog beams. In some implementations, the satellite 105 includes separate processors for analog beamforming and digital beamforming. In cases with multiple analog or digital beamformer processors, the satellite includes logic to operate the processors simultaneously for beamforming with synchronization between signals processed by the different processors. As an illustrative example, in some cases, the satellite 105 includes two digital beamformer processors. Each processor supports K panels (K is an integer and K=5, 8, 10, 12, 15, 16, 20, 24, etc.), with each panel configured to generate up to Y analog beams (Y is an integer and Y=5, 8, 10, 12, 15, 16, 20, 24, etc.). Each processor includes/input ports (I is an integer and I=32, 64, 128, etc.) and O output ports (O is an integer and O=32, 64, 128, etc.), with 2.5 Gigahertz (GHz) bandwidth (or any other suitable bandwidth) per port. Each processor further supports 12.5 Megahertz (MHz) channelization×N (for any integer N>0), with full mesh routing within a processor. In some implementations, the satellite 105 includes one beamformer processor with a configuration similar to that described above.

The hybrid beamforming can be accomplished by space-based beamforming, i.e., on board the satellite, or ground-based beamforming (GBBF), e.g., using a system on Earth, or using a system that combines both space-based beamforming and GBBF. In space-based beamforming, the satellite 105 creates both analog beams using analog beamformers and digital beams using digital beamformer processors on board the satellite. In a GBBF system, the analog and digital beam coefficients are computed by one or more processing systems on the ground. In some implementations, the GBBF system creates the beams by applying the coefficients to the signals, and then sends beams to the satellite for transmission by forwarding through HPAs to the feeds. In other implementations, the GBBF system sends the coefficients to a beamformer processor onboard the satellite. The beamformer processor applies the coefficients to the active signal streams and control the HPAs and feeds for creating the beams.

In a combined system, the satellite 105 creates analog beams on board the satellite, while GBBF computes digital beam coefficients using one or more processing systems on the ground. The GBBF system creates the digital beams using the digital coefficients, and sends the digital beams to the satellite. Alternatively, the GBBF system sends the digital coefficients to the satellite, which uses one or more digital beamformer processors to create the digital beams within the coverage areas of the analog beams.

In some implementations, the satellite 105 includes multiple reflecting dishes for reflecting or redirecting the energy used to form the beams. A reflecting dish may be configured to redirect the beam formed by a given set of feeds. The analog beams can be formed by the satellite using different reflecting dishes to redirect the energy of their respective feeds. Alternatively, the orientation of the reflecting dishes can be configured such that the analog beams generate a cluster that covers a contiguous geographical area on the Earth's surface. In some implementations, the analog beams are generated such that their footprints overlap to some degree, e.g., either partially or completely, in the cluster. In such cases, digital beams are formed by combining the overlapping analog beams in the cluster. In some implementations, the analog beams are generated such that their footprints are non-overlapping in the cluster. In such cases, digital beams are formed separately from the analog beams in the cluster. The shape of the cluster can be varied by adjusting the relative positions of the analog beams, as described in greater detail below. The satellite 105 then uses the digital beamformers to generate digital beams within the coverage areas of the clusters.

In some implementations, the satellite 105 uses a set of steerable antennas, which are combined to generate digital beams. The antennas can be steered using phase shifters, e.g., orientation of the antennas can be changed by using different phase coefficients, or can be mechanically steered, e.g., using reflecting dishes, or mirror-based gimbals or beam-director units. The antennas can also be steered using other methods, e.g., by switching the antenna elements, or by using Risley prisms, phased-array optics, or microelectromechanical systems (MEMS) using micro-mirrors.

The description in the following sections assume that some or all the analog beams in a cluster overlap in full or in part. However, the techniques described herein are also applicable in cases where some or all the analog beams in a cluster are non-overlapping.

In some implementations, the reflecting dishes in the satellite 105 are mounted on gimbals to enable the satellite to dynamically rotate the reflecting dishes to change the analog beam locations on the surface of the Earth after satellite deployment and during subsequent satellite operation. This ability to rotate the reflecting dishes enables the satellite 105 to dynamically change its field of view during operation and, thereby, provides the satellite with much greater communications services coverage flexibility than typical reflecting satellites in that the satellite 105 is able to place analog beams in a much greater portion of the hemisphere of the Earth closest to the satellite by rotating the reflecting dishes as needed during satellite operation. Implementations using rotatable reflecting dishes are described in greater detail in U.S. Pat. No. 9,083,426, titled "Satellite Beamforming," which is incorporated herein by reference in its entirety.

As noted previously, a subset of the feeds in the satellite 105 can be used for transmission in the forward direction from the satellite 105 to the gateways 110 and 125, and the ground terminals 120a-120d. These feeds are referred to as the forward link elements, transmit elements, or forward link feeds. Other feeds can be used for transmission in the return direction from the gateways 110, 125 and the ground terminals 120a-120d to the satellite 105. These feeds are referred to as the return link elements, return link feeds, receive elements, or receiving feeds.

The gateways 110 and 125 are coupled to the network 135 through a communications link 140. The network 135 can be a non-public data network, a public data network or a combination of public and non-public data networks, e.g., the Internet. The communications link 140 can be a high-speed terrestrial connection, such as an optical connection with data rates in the range of gigabits per second. Alternatively, the communications link 140 can be a satellite communications channel through a satellite that is different from the satellite 105. The communications link 140 can be part of a closed network accessible only to components of the satellite communications system 100, or part of an open network that connects the gateway 110 to the network 135.

The gateways 110 and 125 may include one or more modules that process signals exchanged with the satellite elements for beamforming. In some implementations, the gateways 110 and 125 may transmit signals to the satellite 105 over the satellite return links for phase and/or gain calibration for the return link and the forward link. This may be the case, for example, when a GBBF system is employed. The signals used for phase and/or gain calibration may include unique code words that identify such signals as being configured for phase and/or gain calibration. The satellite 105 may measure the phase and gain of the transmitted calibration signals to enable calibration and/or pointing correction. The communications link 140 may be part of a closed network accessible only to components of the satellite communications system 100, or may be part of an open network that connects the gateway 110 to the network 135.

The ground terminals 120a-120d are computing devices or systems able to communicate data to and from the satellite 105 over satellite links. In some implementations, one or more of the ground terminals 120a-120d are enterprise terminals. For example, a ground terminal can be a satellite dish that provides network connectivity to multiple devices at a location, such as an office building. In some implementations, one or more of the ground terminals 120a-120d are individual user terminals. For example, a ground terminal can be a handheld mobile telephone or car phone, a laptop computer, desktop computer, or a phone booth. The ground terminals in separate coverage areas serviced by different clusters of hybrid beams communicate with each other and with the gateways 110 and 125 over the satellite 105 via the satellite links 145, 150 and 155. Each satellite link 145, 150 or 155 includes both an uplink to the satellite 105 and a downlink from the satellite 105.

Figure 2:
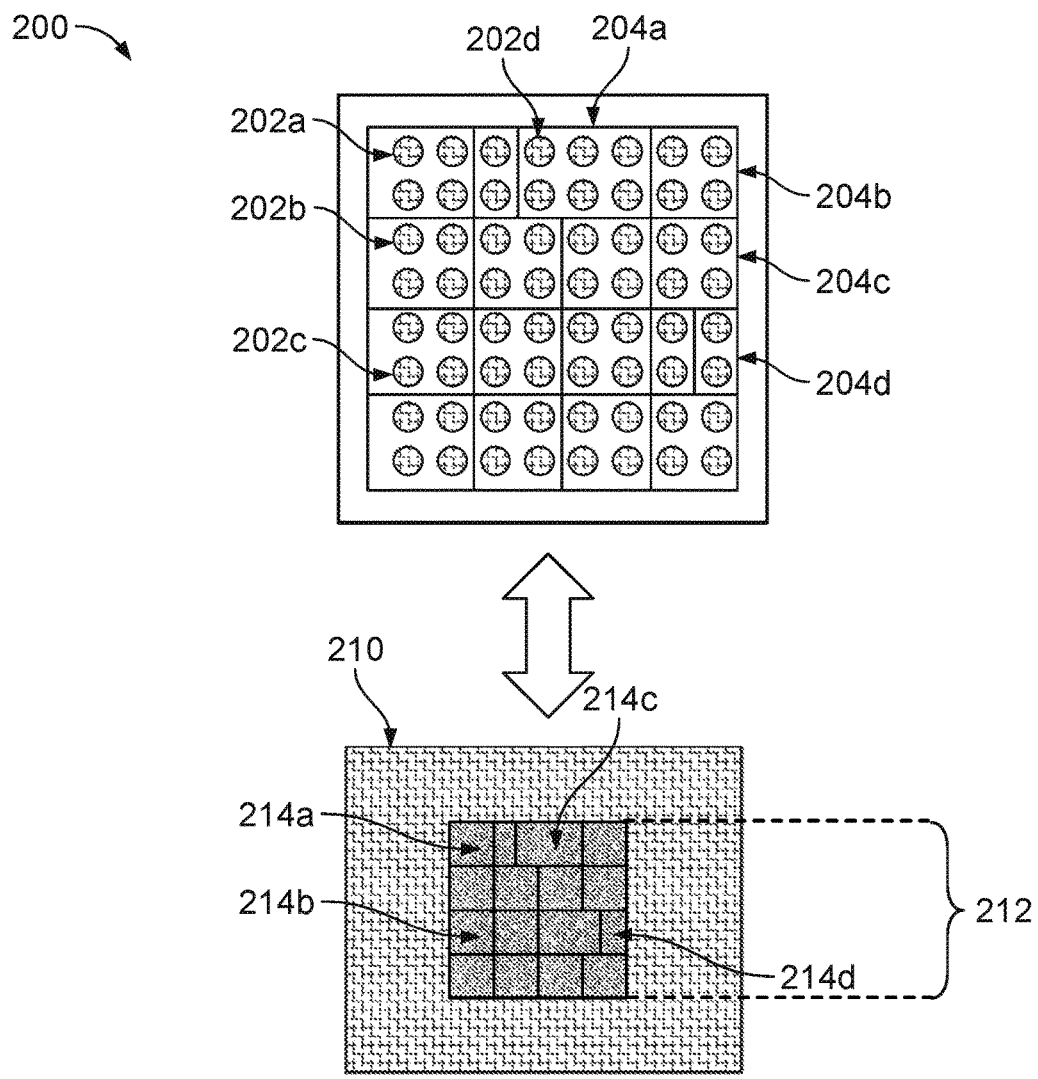
FIG. 2 illustrates an example of a configuration of feeds on a spacecraft for hybrid beamforming.

FIG. 2 illustrates an example of a configuration of feeds in a spacecraft 200 for hybrid beamforming. In some implementations, the spacecraft 200 is a satellite, for example, the satellite 105. As shown, the spacecraft 200 includes multiple antenna elements or feeds, such as 202a, 202b, 202c and 202d. The feeds are divided into panels, such as 204a, 204b, 204c and 204d.

Each feed, e.g., 202a, 202b, 202c, or 202d, uses a phase shifter to form an analog beam, in combination with one or more other feeds. A feed can form one or more beams, by using a different phase shifter for each beam that it forms. The total number of feeds in the spacecraft 200 can range from tens to hundreds and thousands. For example, Table I below shows a configuration in which the spacecraft 200 has 8000 feeds.

The feeds are divided into panels, e.g., as 204a, 204b, 204c and 204d, which is a subset of the feeds used for creating an analog beamformer. The number of feeds can be different for different panels. For example, as shown, panel 204a includes six feeds, panel 204b includes four feeds, while panel 204d includes two feeds. However, panels 204b and 204c each has the same number of feeds, e.g., four feeds. The number of feeds shown in the various panels in FIG. 2 are for illustrative purposes only. In various implementations, the number of feeds in each panel can be different, and can range from a small number, as shown here, to hundreds or thousands.

Each panel forms a number of analog beams in the coverage area, with different panels reusing the frequency spectrum for forming the analog beams. Analog beams sharing the same frequency band overlap partially or fully, thereby forming a cluster, which is an area on the ground where digital beams are generated. Table I below shows an exemplary configuration that is represented by panels per cluster*number of clusters. For example, the first row shows four panels, each of which forms analog beams for 16 clusters. In each of the 16 clusters, the analog beams formed by a panel overlap with the analog beams formed by other panels. The 8000 feeds are divided amongst the four panels to form analog beams. Each feed uses a subset of the 128,000 phase shifters that are assigned to the feed to form analog beams in one or more clusters.

TABLE 1

| Configuration (Panels per cluster*Number of Clusters) | Phase Shifters (Thousands) | Feed Count | Beamformer Processor | Clusters |
|---|---|---|---|---|
| 4 × 16 | 128 | 8000 | 64 Ports; 4 element Beamforming | 16 |
| 4 × 8 | 64 | 8000 | 32 Ports; 4 element Beamforming | 8 |
| 8 × 4 | 32 | 8000 | 32 Ports; 8 element Beamforming | 4 |

Each panel, e.g., each of 204a, 204b, 20c and 204d, is an analog beamformer panel. Each analog beamformer forms analog beams by combining the phase, delay, or amplitude, or any combination of these parameters, of some or all the feeds included the panel. One or more of these parameters are adjusted for each feed to combine into a single signal. Values of these parameter adjustments determine the location and the shape of the far-field coverage area on the Earth's surface, which is the area to be covered by the satellite footprint.

One or more beamformer processors control some, or all, of the panels or analog beamformers to adjust one or more of the phase, delay and amplitude parameters of the constituent feeds such that the analog beams that are formed by these feeds point to an overlapping far-field coverage area on the Earth's surface. The overlapping coverage area is referred to as a cluster. The analog beams in each cluster are fed to one or more digital beamformer processing logic, which form hybrid beams, e.g., digital beams that are generated by combining the amplitude, phase, or delay, or a suitable combination of these parameters, of the analog beams. The hybrid beams have smaller coverage areas within the overlapping coverage area of the analog beams, e.g., within the cluster.

In FIG. 2, a far field coverage area formed by analog beams generated by one or more panels of the spacecraft 200, e.g., panels 204a, 204b, 204c and 204d, among others, is represented by 210. One or more analog beams generated by the panels overlap in the far field coverage area within the region 212, which represents a cluster. One or more hybrid beams, e.g., 214a, 214b, 214c and 214d, are generated within the cluster region 212 by combining the overlapping analog beams to create digital beams. As noted previously, each hybrid beam is a digital beam that is generated by combining underlying analog beams.

As shown in FIG. 2, the hybrid beams can be of different shapes and/or sizes. For example, hybrid beams 214a and 214b are of the same size and shape. However, hybrid beam 214c is of a different size and shape than the beams 214a and 214b. Hybrid beam 214d is also of a different size and shape than the hybrid beams 214a, 214b and 214c.

As described in detail below, the number of hybrid beams that are formed in a cluster can vary from cluster to cluster. For example, some clusters may have a large number of hybrid beams. Some clusters may have only a single hybrid beam that is formed by combing all the analog beams corresponding to the cluster.

Figure 3:
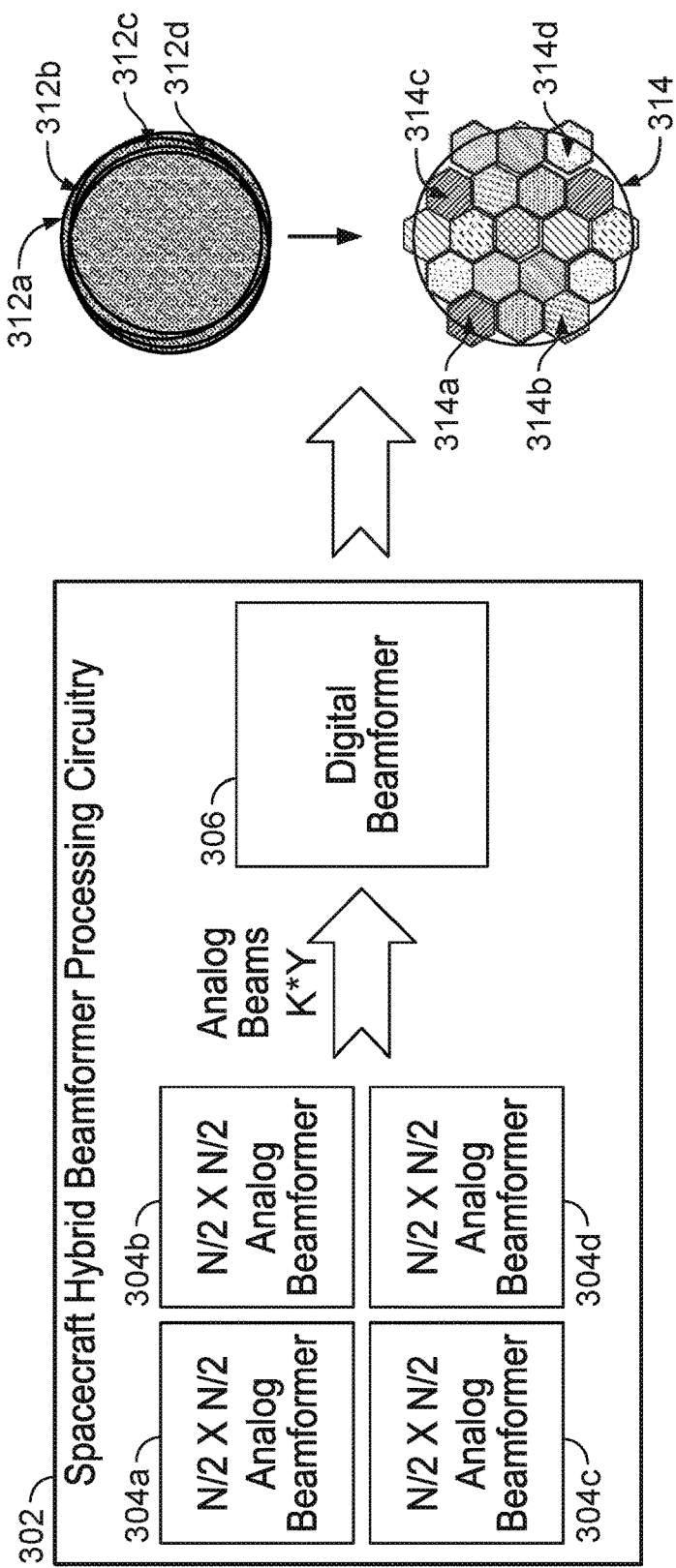
FIG. 3 illustrates an example of a hybrid beamformer processing circuitry in a spacecraft for generating hybrid beams.

FIG. 3 illustrates an example of a hybrid beamformer processing circuitry 302 in a spacecraft for generating hybrid beams, e.g., 314a, 314b, 314c and 314d, among others. The spacecraft hybrid beamformer processing circuitry 302 includes K analog beamformers (K is an integer and K>0), such as 304a, 304b, 304c and 304d. The spacecraft hybrid beamformer processing circuitry 302 also includes a digital beamformer 306. In some implementations, the spacecraft is a satellite, e.g., satellite 105, and the processing circuitry 302 is present in the satellite 105. The spacecraft hybrid beamformer processing circuitry 302 is also referred to as hybrid beamformer 302.

In some implementations, the spacecraft hybrid beamformer processing circuitry 302 includes a combined onboard processor with logic for controlling the analog beamformers to form analog beams, and logic for the digital beamformer 306 to form digital beams. In some implementations, the spacecraft hybrid beamformer processing circuitry 302 includes separate onboard processors for controlling the analog beamformers that are different from the digital beamformer 306. The following description is applicable both implementations.

Each analog beamformer, e.g., 304a, 304b, 304c and 304d, is a panel that includes one or more feeds, as described above. In some implementations, there are four analog beamformers (K=4), as shown in FIG. 3. However, in other implementations, there are different numbers of analog beamformers on the spacecraft (e.g., K=2, 5, 8, 13, 16, 24, among other values). In some implementations, the analog beamformers correspond to direct radiating array (DRA) panels. Each DRA panel includes one or more feeds. In some implementations, the analog beamformers correspond to parabolic reflectors. In such cases, each analog beamformer is a parabolic reflector that includes one or more feeds. Other configurations of the analog beamformers are also possible.

The spacecraft includes N×N feeds (N is an integer and N>0). In some implementations, N is on the order of hundreds or thousands, e.g., as shown in Table I. In the processing circuitry 302, the N×N feeds are divided evenly among the four analog beamformers 304a, 304b, 304c and 304d, such that each analog beamformer includes N/2×N/2 feeds. However, in some implementations, the number of feeds included in an analog beamformer can vary, e.g., as discussed above with respect to the panels 204a, 204b, 204c and 204d.

As shown, in some implementations, each analog beamformer, e.g., 304a, 304b, 304c and 304d, controls the constituent N/2×N/2 feeds to generate Y analog beams (Y is an integer and Y>0). In some implementations, an analog beamformer generates each analog beam by combining each of the constituent feeds. This is the case, for example, when there are Y phase shifters per feed. In other implementations, an analog beamformer generates each analog beam by combining a subset of the constituent feeds. In such cases, the number of phase shifters per feed can be less than Y. Alternatively, each feed can have Y phase shifters, but the analog beamformer does not use all the feeds for each beam. In some implementations, different analog beamformers can generate different numbers of analog beams.

As shown, in some implementations, the K analog beamformers generate up to a total of K*Y analog beams. Analog beams from one or more analog beamformers overlap with each another in a far field coverage area, forming a cluster. For example, analog beams 312a, 312b, 312c and 312d, among others, overlap in part or in full to generate a cluster 314. In some implementations, one or more analog beams from each of the K analog beamformers overlap to form a cluster. In some implementations, a single cluster is generated by combining one analog beam from each analog beamformer. In such cases, up to a total of Y clusters are possible, since each analog beamformer can generate up to Y beams. In some implementations, one or more analog beams from a subset of the K analog beamformers overlap to form a cluster. For example, in some cases, one analog beam per analog beamformer across half the analog beamformers overlap in a cluster, thereby forming up to 2Y clusters.

In some implementations, the overall frequency spectrum available to the spacecraft is reused by each analog beamformer, which divides the available frequency spectrum between the analog beams that the beamformer generates. Analog beams from different analog beamformers that have the same frequency band overlap to form a cluster. In such cases, the frequency band in each cluster is different from the frequency band in adjacent clusters. However, frequency bands can be reused amongst non-adjacent clusters.

In some cases, the spacing between the panels or analog beamformers is configured to maximize the communications capacity of the spacecraft by allowing a tighter cluster of beams, while limiting digital side lobes. The digital side lobes are also referred to as grating lobes, which are caused by the wide spacing between panel centers. The wider the spacing, the closer in are the digital side lobes or grating lobes to the main beam. In this context, maximizing the communications capacity refers to achieving a highest communications capacity of a communications link created by the satellite that is achievable in view of the physical constraints of the satellite hardware, or the communications medium (e.g., air), or both. In some implementations, maximizing the communications capacity refers to achieving an upper limit data rate that is configured by the satellite administrator.

A larger spacing between the panels results in clusters that are closer together, allowing for a tighter cluster of beams, which thereby improves communication capacity. The digital beam gains are also closer to beam center of the underlying analog beams, and the gain roll off before a beam can re-use the frequency band is reduced. The larger inter-panel spacing also reduces the digital beam size, while improving the maximum capacity. However, too much increase in spacing can adversely impact performance due to interference from digital side lobes, which are described below.

As shown, in some implementations, the K analog beamformers feed the K*Y analog beams to the digital beamformer 306 to generate hybrid beams. For each overlapping cluster of analog beams, the digital beamformer 306 divides the corresponding frequency band into channels, and generates a digital beam for each channel by combining the analog beams in the cluster, as described previously. The digital beamformer 306 can generate potentially hundreds or thousands of digital beams covering the cluster area defined by the EOC of the analog beams in the cluster. For example, as shown in FIG. 3, the digital beamformer 306 generates hybrid beams, such as 314$a$, 314$b$, 314$c$ and 314$d$, in the cluster 314, where each hybrid beam is assigned a frequency channel that is a part of the overall frequency band covered by the analog beams in the cluster 314, such as analog beams 312$a$, 312$b$, 312$c$ and 312$d$. Although only one digital beamformer 306 is shown, in some implementations, the spacecraft hybrid beamformer processing circuitry 302 includes more than one digital beamformer.

In the above manner, the spacecraft hybrid beamformer processing circuitry 302 functions as a hybrid beamformer that creates hybrid beams by generating digital beams using combinations of overlapping analog beams. In doing so, the hybrid beamformer allows the analog beamformers, e.g., 304$a$, 304$b$, 304$c$ and 304$d$, to support a large number of feeds and the digital beamformer e.g., 306, to create a large number of beams for providing coverage. The number of clusters that are formed correspond to the number of regions that have to be covered for communications coverage. As opposed to pure digital beamforming, where digital beams can be created in any region, in hybrid beamforming, the digital beamformers in the spacecraft are constrained to create the hybrid beams, i.e., the digital beams, within the coverage areas of the underlying analog beams. The analog beamformers combine the analog beams to provide the contours of the coverage areas in which the digital beams are generated.

As described above, with the same analog beamforming hardware to create K beams, the hybrid beamformer supports up to K times the bandwidth; K times the coverage area; and higher EOC gain over most beams. The spacecraft hybrid beamformer processing circuitry 302 thereby addresses the hardware constraints of analog beamformers to support a large number of beams (e.g., in the order of hundreds or thousands), since every analog beam requires one phase shifter per feed, and addresses the processing constraints of digital beamformers to process a large number of feeds.

In general, in some implementations, for a spacecraft with N×N feeds and K panels/analog beamformers, the N×N feeds can be evenly divided among the K analog beamformers such that each analog beamformer gets $N/\sqrt{K} \times N/\sqrt{K}$ feeds. If each analog beamformer forms Y analog beams, then a total of K*Y analog beams are generated by the processing circuitry on board the spacecraft. In some implementations, K*Y analog beams are generated for transmitting data, and another K*Y analog beams are generated in the receive direction. For either direction, the K*Y analog beams are fed to digital beamformers. In some implementations, one or more onboard payload processors include Y digital beamformers, e.g., one for each analog beam in a cluster. In some implementations, each digital beamformer includes circuitry for K×K beamforming, e.g., K inputs and K outputs. For each cluster, the Y digital beamformers channelizes the available bandwidth into Z channels (Z is an integer and Z>0), and generates Z digital beams within the cluster coverage area by combining the analog beams that overlap to form the cluster. Each digital beam is assigned one of the Z channels. Accordingly, a total of K*Y*Z hybrid beams are formed.

As an example, in some cases, the processing circuitry in a satellite, e.g., satellite 105, includes 8 panels or analog beamformers, each with 16×16 feeds. The 8 analog beamformers correspond to 8 parabolic reflectors, with the feeds for each analog beamformer coupled to a separate parabolic reflector. Each analog beamformer forms 16 analog beams. The analog beamformer circuitry in the satellite therefore generates 128 analog beams in the transmit direction, and 128 analog beams in the receive direction. The transmit and receive analog beams are fed to a digital beamformer, which includes two processors. Each digital beamformer processor, which is capable of 8×8 beamforming, has 64 input ports and 64 output ports, with 2.5 GHz bandwidth per port. Each processor divides the available bandwidth in to 12.5 MHz channels. A total of up to 22,000 hybrid beams, e.g., digital beams formed by combining the analog beams, can be generated with this configuration of the satellite processing circuitry for hybrid beamforming.

In some implementations, each hybrid beam covers analog beamwidth corresponding to 3 decibels (3 dB). As described above, the available analog bandwidth in a cluster is divided into a large number of digital beams, e.g., the digital beams in each cluster can range from tens to hundreds or thousands. In some implementations, the number of digital beams generated in a cluster depends on a target degradation in signal power from the beam peak, e.g., center, of a digital beam to the edge of the digital beam. For example, in some cases, the target degradation in signal power is 0.5 dB such that the digital edge of cell is near the beam peak. In these cases, a sufficient number of digital beams are generated such that the digital edge of cell. less than 0.5 dB down compared to the beam peak. In some implementations, the peak gain of a digital beam, e.g. the beam peak, is $10*\log_{10}(K)$ dB higher than analog beam, where K is the number of analog beamformers, as described above.

In the above manner, a spacecraft, e.g., a satellite, performs hybrid beamforming. To summarize, the satellite uses transmit and receive antennas that utilize a hierarchical structure, in which multiple feeds are arranged in a panel, and multiple panels coordinate to form beams to cover a target area. Each panel uses analog amplitude (or gain), delay or phase adjustment, or any combination of these, to combine signals for multiple feeds in the panel, to create analog beams in clusters in the far field covering regions of the target area. The values of the amplitude (or gain), delay or phase adjustments determine positions of the far-field coverage areas. Digital beamformer processors use amplitude (or gain), delay or phase adjustment, or any combination of these, to combine analog beam signals from one or more panels to generate hybrid beams in each cluster. In this manner, the analog beamformer panels and the digital beamformer processors form hybrid beams in a hierarchical structure. The analog and digital amplitude (or gain), delay or phase adjustments are configurable, and modification of these parameters allows the clusters of coverage areas in the far field to be moved.

In some implementations, the spacecraft, e.g., satellite 105, combines electronically steerable antennas with digital beams for hybrid beamforming. In such cases, the electronically steerable antennas are used in place of feeds to delineate coverage areas in which clusters of digital beams are formed.

Figure 4A:
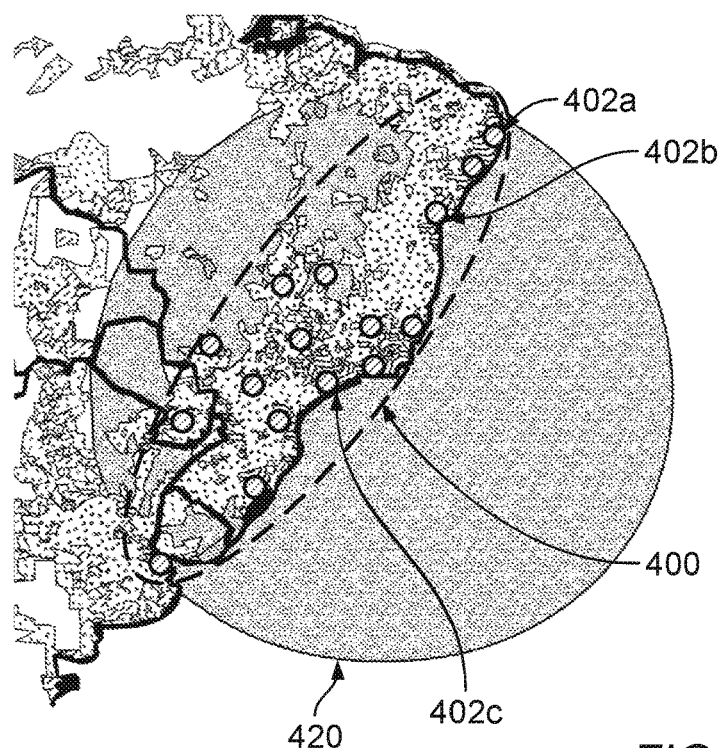
FIGS. 4A and 4B present comparative illustrations of coverage provided respectively by analog and hybrid beams in a target area on the Earth's surface.
Figure 4B:
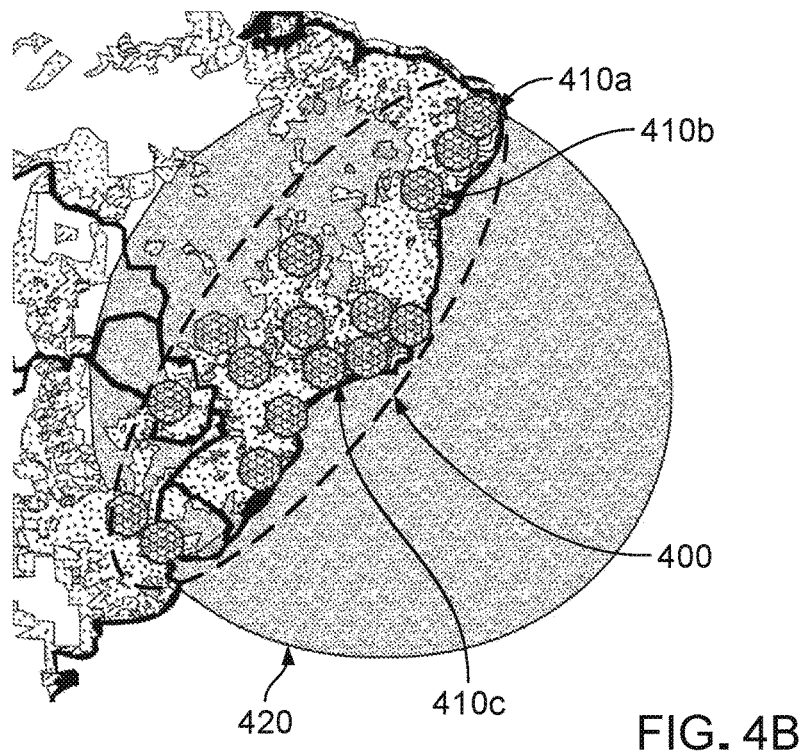

FIGS. 4A and 4B present comparative illustrations of coverage provided respectively by analog and hybrid beams in a target area 400 on the Earth's surface. FIG. 4A shows analog beams, such as 402a, 402b and 402c, among others, covering regions in the target area 400, which is within the footprint 420 of a spacecraft, e.g., satellite 105. The analog beams are formed by analog beamformers described above. FIG. 4B shows clusters of hybrid beams, such as 410a, 410b and 410c, among others, providing coverage in similar regions in the target area 400. As described above, a hybrid analog/digital beamformer forms the hybrid beams in each cluster, e.g., 410a, 410b and 410c, by combining col-located or overlapping analog beams in the corresponding cluster to generate digital beams, each of which occupies a frequency channel in the overall spectrum covered by the analog beams in the cluster.

As shown in FIG. 4B, each cluster, e.g., 410a, 410b and 410c, includes many hybrid, i.e., digital beams. By forming analog beams in each cluster using a subset of the total feeds in the spacecraft (e.g., using one or more beams per analog beamformer), the coverage area of each cluster is larger, as shown, compared to the coverage area of an analog beam that is formed using all the feeds in the spacecraft. FIG. 5 presents a comparative illustration of examples of coverage areas 502 and 504 respectively provided by a pure analog beam and overlapping analog beams formed using a hybrid beamformer. Considering a configuration for a spacecraft with N×N feeds, the coverage area 502 represents an area covered by an analog beam formed using all N×N feeds, e.g., when analog-only beamforming is used. If the spacecraft includes K panels or analog beamformers, in which the N feeds are evenly divided among the K analog beamformers such that each analog beamformer gets $N/\sqrt{K} \times N/\sqrt{K}$ feeds, then coverage area 504 represents an area covered by overlapping analog beams in a cluster that includes one analog beam from each analog beamformer, e.g., when hybrid beamforming is used. Each analog beam in the coverage area 504 is formed by 1/K feeds if all the feeds in a panel are used to form the analog beam.

The beamwidth from the peak to the EOC in both coverage areas 502 and 504 is the same (e.g., 3 dB beamwidth EOC). Given the larger coverage area in hybrid beamforming, the peak gain of the overlapping analog beams in the cluster is lower than the peak gain of analog-only beamforming. For example, the peak gain of the analog beams in the coverage area 504 is $10 \log_{10}(K)$ dB lower compared to that of the analog beam in the coverage area 502. As a numerical example, in some implementations, the peak gain of the analog beams in the coverage area 504 is 6 dB less than the peak gain of the analog beam in the coverage area 502.

The loss in peak gain for the analog beams in hybrid beamforming can be recovered by the hybrid beams. For example, in the configuration described above in which K analog beams overlap in a cluster (e.g., one analog beam from each of K clusters) and are combined to form hybrid beams, then the peak gain of each hybrid beam is $10 \log_{10}(K)$ dB higher than the underlying analog beams in the cluster.

Although FIGS. 4A and 4B show approximately circular coverage areas, in some implementations, the coverage areas can be arbitrarily shaped to effectively cover users. FIG. 6 illustrates an example of hybrid beamforming to fully cover a non-circular shaped region 600. A spacecraft, e.g., satellite 105, provides coverage to the region 600. In some implementations, the region 600 is part of a larger target area, e.g., the target area 400. A hybrid beamformer on board the spacecraft creates multiple analog beams, such as 602a, 602b and 602c, among others, that are spread out to fully cover the region 600. As shown, all the analog beams are not co-located. For example, analog beams 602a and 602c partially overlap with one another, and analog beams 602b and 602c partially overlap with one another, but analog beams 602a and 602b do not overlap. By spreading the analog beams in this manner, the hybrid beamformer can cover an arbitrarily shaped target area.

The hybrid beamformer combines the analog beams, e.g., 602a, 602b and 602c, among others, to create many (e.g. hundreds or thousands) of unique hybrid (e.g., digital) beams, such as 604a, 604b and 604c. The hybrid beamformer generates a sufficient number of hybrid beams so that the edge of cell of the digital beams is near the beam peak (e.g., less than 0.5 dB down from the beam peak to edge of cell), as described previously. However, since the analog beams are spread out, the peak gain of a hybrid beam is lower, compared to the case where all the analog beams are co-located (e.g., in a circular coverage area).

Figure 7B:
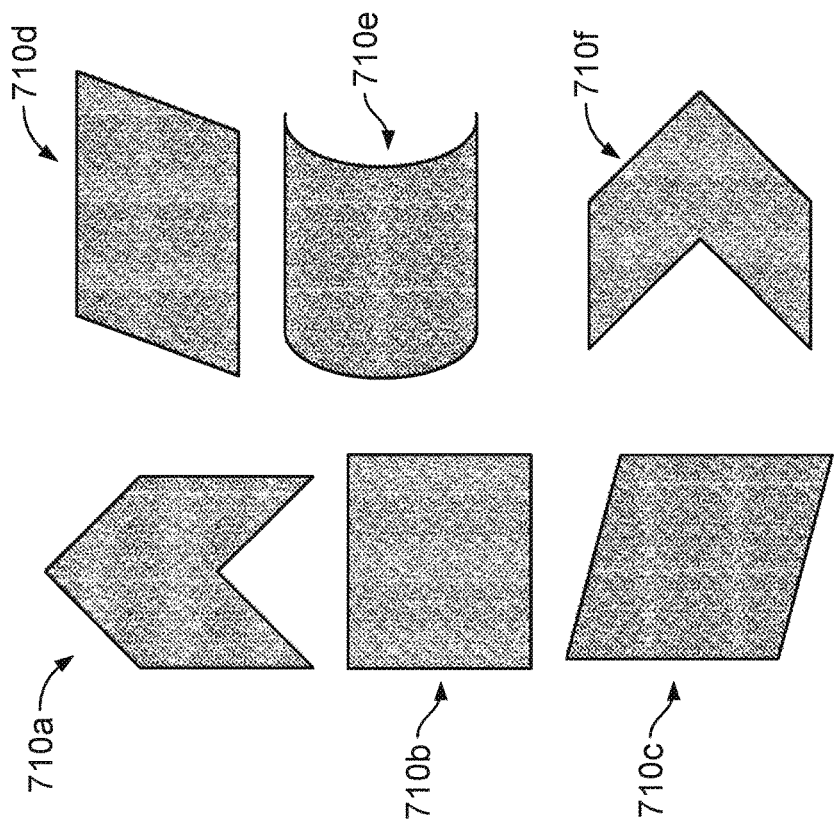
FIGS. 7A and 7B illustrate examples of different cluster shapes that can be formed using hybrid beamforming.
Figure 7A:
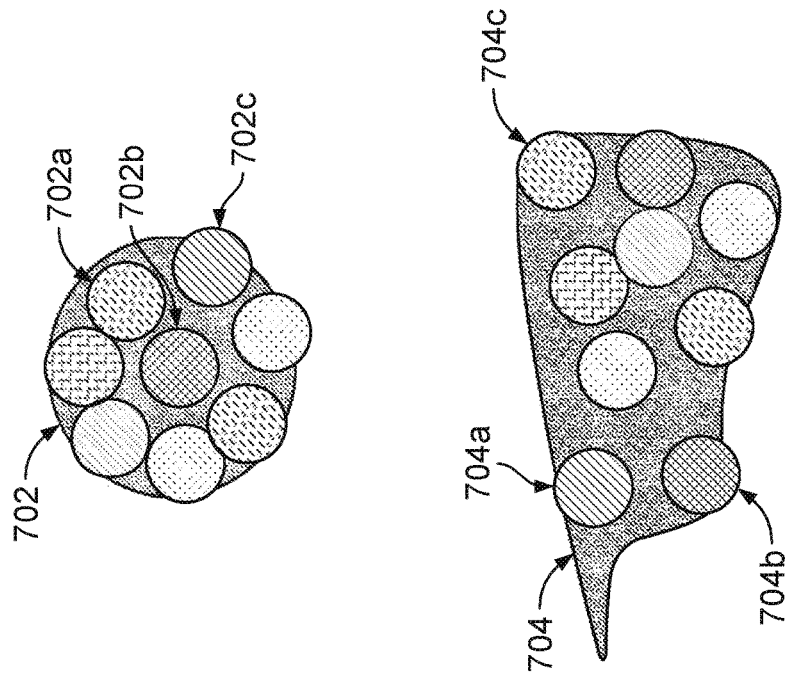

FIGS. 7A and 7B illustrate examples of different cluster shapes that can be formed using hybrid beamforming. As described previously, a cluster is an area on the ground that can support hybrid beams. A cluster is formed by overlapping, partly or fully, analog beams formed by analog beamformers, e.g., 304a, 304b, 304c and 304d shown previously. FIG. 7A shows that a cluster 702 can be approximately circular, e.g., when all the analog beams overlap with one another. A cluster can also be arbitrarily shaped, e.g., cluster 704. This is the case, for example, when the analog beams are spread out to cover the target area, such as described with respect to the region 600. In some implementations, clusters of different shapes, such as clusters 702 and 704, are formed to cover different regions of the target area, with these clusters coexisting. In some implementations, the shapes of the clusters are determined to meet specified performance requirements at EOC.

A number of hybrid beams, which are digital beams formed by combining the analog beams in a cluster, are generated for each cluster. For example, cluster 702 includes hybrid beams 702a, 702b and 702c, among others, while cluster 704 includes hybrid beams 704a, 704b and 704c, among others. The number of hybrid beams can range from tens to hundreds or thousands. In some implementations, the hybrid beams are tightly packed together to provide continuous coverage in the region corresponding to the cluster, e.g., the hybrid beams 604a, 604b and 604c, among others, in the region 600. In some implementations, the hybrid beams are less densely packed to cover only areas where users are present. For example, the hybrid beams 702a, 702b and 702c, among others, in the cluster 702 are less tightly packed than the hybrid beams 604a, 604b and 604c. In some cases, the hybrid beams are spread out even further to cover selected portions in a cluster. For example, there are wide gaps between the hybrid beams 704a, 704b and 704c, among others, in the cluster 704, indicating areas where no beam coverage exists. This can be the case when coverage is provided in less populated areas. In some implementations, clusters with different densities of hybrid beams coexist to cover different regions in a target area, where the different regions have different coverage requirements. For example, clusters 702 and 704 can coexist with the respective configurations of hybrid beams as shown.

As noted previously, hybrid beamforming clusters can be K times larger in area than for similar analog beams in analog-only beamforming (where K is the number of analog beamformers). The full frequency spectrum (uplink and downlink) can be re-used multiple times, and up to K times in some cases. The hybrid beams match the yield of the underlying analog beams with same or higher gain. In some implementations, wider bandwidth usage by the hybrid beams provides higher capacity because lower modulation codes are much more power efficient compared to higher modulation codes.

FIG. 7B shows some examples of varying cluster shapes that can be achieved using hybrid beamforming. A hybrid beamformer, e.g., the spacecraft hybrid beamformer processing circuitry 302, can form clusters shaped as in clusters 710a and 710f, square clusters such as 710b, parallelogram shaped clusters such as 710c and 710d, or semi-cylindrical shaped clusters such as 710e, among other cluster shapes. Each of the clusters 710a, 710b, 710c, 710d, 710e and 710f cluster shapes can fully re-use the frequency spectrum available for hybrid beamforming. The entire spectrum can be assigned to any part of a cluster. Combinations of these shapes overlapped in a single cluster can be created by segmenting the frequency band, and assigning each band segment to a different cluster shape. Size of any dimension of a cluster can also be adjusted. For example, in some implementations, up to +/−10% of the optimal shape of a cluster can be adjusted with sacrificing 0.5 dB in gain, but without any change in the carrier to interference (C/I) ratio.

Figure 8:
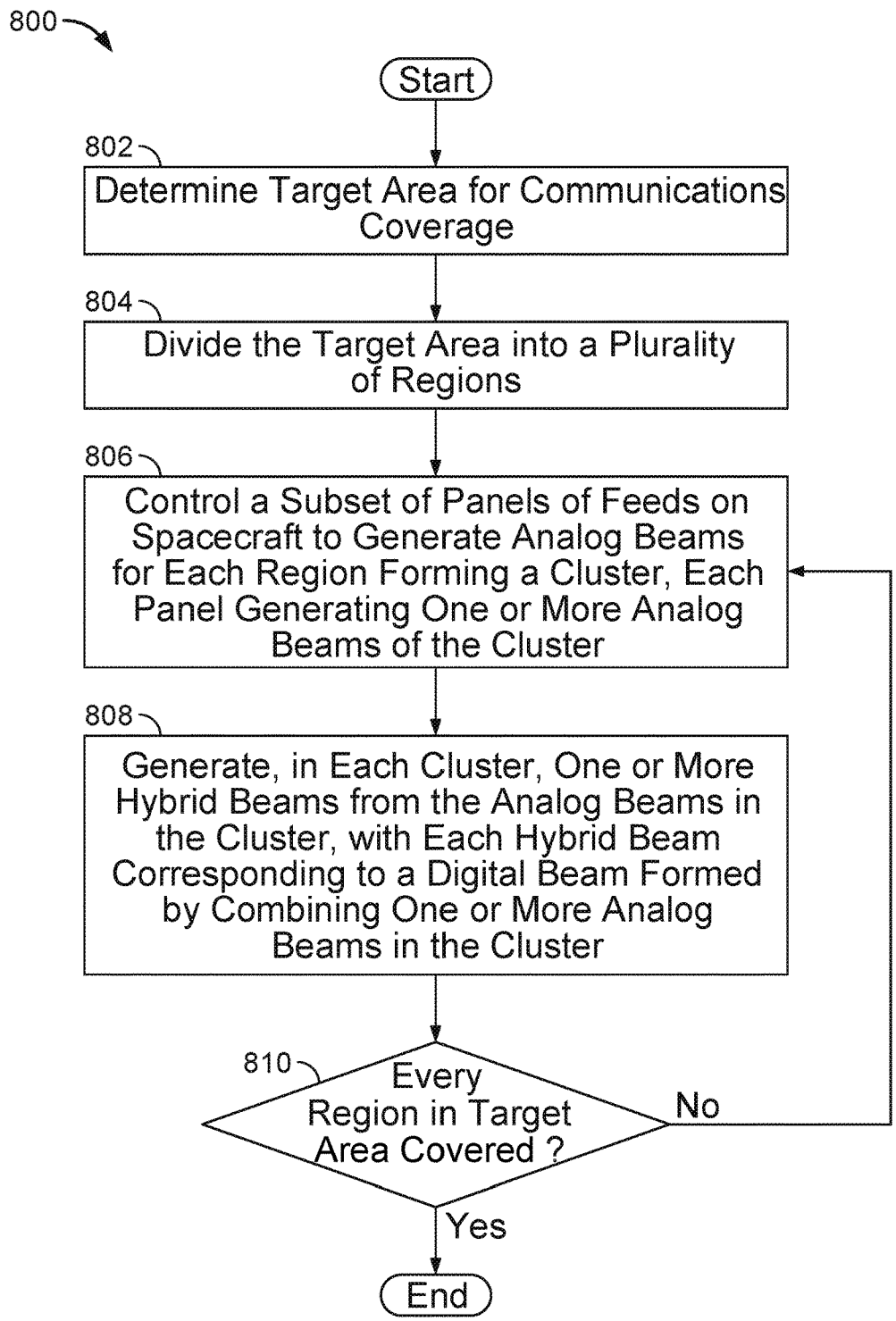
FIG. 8 illustrates an example of a process for forming hybrid beams.

FIG. 8 illustrates an example of a process 800 for forming hybrid beams. In some implementations, the process 800 is performed by hybrid beamformer processing circuitry in a spacecraft, e.g., by the spacecraft hybrid beamformer processing circuitry 302, which includes one or more analog beamformer processors 304a, 304b, 304c and 304d, and one or more digital beamformer processors such as 306. As described previously, in some implementations, the spacecraft is an orbiting satellite, such as the satellite 105. Accordingly, the following section describes the process 800 with respect to the spacecraft hybrid beamformer processing circuitry 302. However, the process 800 also can be performed by other processing circuitry configurations, and/or by other types of spacecraft.

In some implementations, the hybrid beamformer processing circuitry, referred to henceforth interchangeably either as hybrid beamformer or processing circuitry, executes one or more instructions to perform the process 800. These instructions are stored in memory, e.g., flash memory, hard disk or some other suitable memory, which is coupled to the hybrid beamformer on board the spacecraft. Alternatively, in some implementations, the instructions are sent to the hybrid beamformer on board the spacecraft from the ground, e.g., through satellite gateway 110 or 125.

The process 800 starts at 802, in which a target area for communications coverage is determined. For example, the hybrid beamformer processing circuitry 302 determines an area on the Earth's surface for communications coverage, such as target area 400. In some implementations, information about the target area, e.g., coordinates of the area, are sent to the hybrid beamformer on board the spacecraft, e.g., as part of telecommunications commands from ground stations via the satellite gateways 110 or 125.

At 804, the hybrid beamformer divides the target area into a plurality of regions. For example, the hybrid beamformer processing circuitry 302 divides the target area 400 into a plurality of regions. In some implementations, the plurality of regions includes the region 600. In some implementations, the plurality of regions is determined based on the presence of user population in the target area, or the communications requirement in various regions, or both. For example, only regions in the target area where users are present are selected in some cases, while uninhabited areas are avoided. Additionally or alternatively, in some cases, areas where communications equipment are present, such as data gathering apparatus, or areas where users are predicted to be present within a known time period, such as a shipping channel in an ocean, are selected in some cases.

At 806, the hybrid beamformer controls a subset of panels of feeds on the spacecraft to generate analog beams for each region, thereby forming a cluster, with each panel generating one or more analog beams of the cluster. For example, the hybrid beamformer processing circuitry 302 controls the analog beamformers 304a, 304b, 304c and 304d to generate analog beams for each identified region of the target area where communications coverage is to be provided. An analog beamformer generates an analog beam by combining the phase, delay, gain, or any combination of these, of the feeds in the corresponding panel of the analog beamformer.

As described previously, in some implementations, one or more analog beams formed by each analog beamformer are provided to each region. In some cases, each region is provided one analog beam from each analog beamformer. If an analog beamformer can form Y analog beams (e.g., there are Y phase shifters per feed in the panel), then up to Y clusters can be generated, thereby covering up to Y regions. With K panels present on the spacecraft, a total of up to K*Y analog beams can be generated, as described earlier.

In some implementations, one or more analog beams formed by a subset of analog beamformers are provided to each region. For example, analog beams formed by half the analog beamformers, such as 304*a* and 304*b*, cover a first group of regions, while analog beams formed by the other half the analog beamformers, such as 304*c* and 304*d*, cover a second group of regions, which are different from the first group of regions. As described previously, in such cases, up to 2*Y clusters can be formed, using the example configuration above. Other configurations are also possible, as described further below. For example, all the analog beams from all the panels can be formed to overlap with each other in some cases, thereby covering a single region.

In some cases, all the analog beams in a cluster can overlap, e.g., as shown with respect to analog beams 312*a*, 312*b*, 312*c* and 312*d*. In some cases, the analog beams in a cluster can be spread out, e.g., as shown with respect to analog beams 602*a*, 602*b* and 602*c*. The shape of a cluster is determined by the number of analog beams present in the cluster, and the way the analog beams overlap. For example, if all the analog beams overlap to the greatest extent, such as analog beams 312*a*, 312*b*, 312*c* and 312*d*, then a circular shaped cluster is generated, such as cluster 702. However, if the analog beams are spread out, then clusters of arbitrary shapes can be formed, such as clusters 704, 710*a*, 710*b*, 710*c*, 710*d*, 710*e* and 710*f*. In some implementations, the number of analog beams in a region, and the relative positions of the analog beams in the region, are determined to maximize the coverage gain over the region.

At 808, the hybrid beamformer generates, in each cluster, one or more hybrid beams from the analog beams in the cluster, with each hybrid beam corresponding to a digital beam formed by combining one or more analog beams in the cluster. For example, the hybrid beamformer processing circuitry 302 controls the digital beamformer 306 to generate, for each region, digital beams by combining the analog beams in the cluster corresponding to the region. The digital beamformer combines the magnitude, delay, or phase, or any combination of these parameters, of the analog beams in the region to form the digital beams for the region.

As described previously, each cluster of hybrid beams provides coverage over a wider area compared to analog beams formed using analog-only beamforming, e.g., as shown by clusters 410*a*, 410*b* and 410*c* in comparison to analog beams 402*a*, 402*b* and 402*c*. Depending on the coverage requirement, the relative positions of hybrid beams in a cluster can be different from that of other clusters. The coverage requirement depends, on the gain roll off from the peak to the EOC of the hybrid beams, or the locations of users, among other factors, as described previously. For example, the hybrid beams can be tightly packed in a cluster, e.g., as shown with respect to hybrid beams 604*a*, 604*b* and 604*c*. In some implementations, the hybrid beams are tightly packed so that edge of digital beam roll off is negligible (e.g. less than 0.5 dB). Alternatively, the hybrid beams can be more loosely packed, e.g., as shown with respect to hybrid beams 702*a*, 702*b* and 702*c*, or the hybrid beams can be spread out such that some hybrid beams are distant from other hybrid beams in a cluster, e.g., as shown with respect to hybrid beams 704*a*, 704*b* and 704*c*.

In some implementations, additional bandwidth is put into hybrid beams that require higher capacity. The available frequency spectrum within a region can be completely re-used up to K times (when there are K analog beamformers), depending on the relative distribution of the hybrid beams within the region. In some implementations, the frequency spectrum is reused a lower number of times than K, depending on the target C/I and the relative distribution of the hybrid beams within the region.

At 810, the hybrid beamformer checks whether every region in the target area is covered. For example, after generating hybrid beams for a selected region in the target area 400, the hybrid beamformer processing circuitry checks whether hybrid beams for other identified regions in the target area are yet to be generated. If every region is not covered, e.g., one or more regions are remaining for which hybrid beams are yet to be generated, then the hybrid beamformer repeats the process at 806 and 808 until all the identified regions are covered. When hybrid beams have been generated for all the identified regions, then the hybrid beamforming generation process 800 ends.

In some implementations, one or more clusters of hybrid beams coexist to provide simultaneous coverage to multiple regions, as described previously. However, in some cases, the number of regions to be covered can be more than the number of clusters that can be simultaneously supported by the analog beamformers in the spacecraft, e.g., the satellite 105, or regions may be far apart such that all the regions are not simultaneously within the footprint of the spacecraft at a time. In such cases, the hybrid beamformer circuitry on board the spacecraft covers all the regions by forming clusters of hybrid beams in the different regions in successive intervals of time, with a subset of the regions being covered at a time interval. The spacecraft "hops" from one location to another location through a sequence of locations in the far field coverage area. In some implementations, air interfaces or communications protocols, such as DVBS2X, can synchronize transmissions with satellite hopping to provide a service to both hopped cluster locations.

The spacecraft, e.g., the satellite 105, can hop from one location to another using one of several different hopping patterns, which include: (i) analog only hopping; (ii) analog/digital hopping; and (iii) digital only hopping. In analog only hopping, the spacecraft systematically changes the analog coefficients for the feeds in each panel to result in the cluster of hybrid beams hopping from one location to another. This has the effect of a cluster hopping from one location to another due to change in the coverage area of the overlapping analog beams. The relative positions and shapes of the hybrid beams within a cluster remain unchanged. In some implementations, analog only hopping is achieved by the analog beamformers making a single delay or gain adjustment to coefficients of the analog beams before the analog beams are fed to the digital beamformer processor. In some implementations, delay and gain adjustments on each analog signal ensures that the relative positions and performance of the digital beams are unchanged.

As an example of analog only hopping, in some cases, the cluster 410*a* (or the cluster 410*b*, 410*c*, 702 or 704, among others) hops from a first location in a first time interval to a second location in the next time interval. The analog beamformer processors, e.g., 304*a*, 304*b*, 304*c* and/or 304*d*, adjust the coefficients of the analog beams in the cluster 410 such that the terrestrial region covered by these beams changes. However, the coefficients of the digital beams formed by the digital beamformer using these analog beams remain unchanged, and therefore the relative positions and shapes of the hybrid beams within the cluster 410*a* remain unchanged.

In some implementations, analog only hopping occurs in a scheduled repeating loop. For example, a cluster of digital beams will provide coverage to a first location for a first period of time; and then re-orient the corresponding analog beams to provide coverage to a second location for a second period of time, and so on, before returning to the first location to again provide coverage for the first period of time. In some implementations, the first period and second period are preselected. In some implementations, the first period and second period can be dynamically determined, depending on the coverage requirements. In some implementations, one or more periods are the same. In other implementations, every period is different.

In analog/digital hopping, the hybrid beamformer processing circuitry on board the spacecraft changes both analog and digital coefficients to result in a cluster of hybrid beams hopping from one location to another. The relative positions and shapes of the digital beams within a cluster change, along with change in the location (and, in some implementations, shape) of the analog coverage area. In some implementations, the analog coefficients are adjusted on a scheduled repeating basis. The digital beam coefficients are also adjusted on a scheduled repeating basis, with adjustments to the digital beam coefficients synchronized with adjustments to the analog coefficients. In some implementations, analog/digital hopping results in changes to beam-to-beam routing as well as channel bandwidths.

As an example of analog/digital hopping, in some cases, the cluster 702 hops from a first location in a first time interval to a second location in the next time interval. The analog beamformer processors, e.g., 304a, 304b, 304c and/or 304d, adjust the coefficients of the analog beams in the cluster 410 such that the terrestrial region covered by these beams changes, and the shape of the cluster also changes to that of cluster 704. The digital beamformer processor 306 also adjusts the coefficients of the digital beams that are formed, and therefore the relative positions and/or shapes of the hybrid beams within the cluster 702 change, for example from the relative orientations of hybrid beams 702a, 702b and 702c to the relative orientations of hybrid beams 704a, 704b and 704c.

Figure 8A:
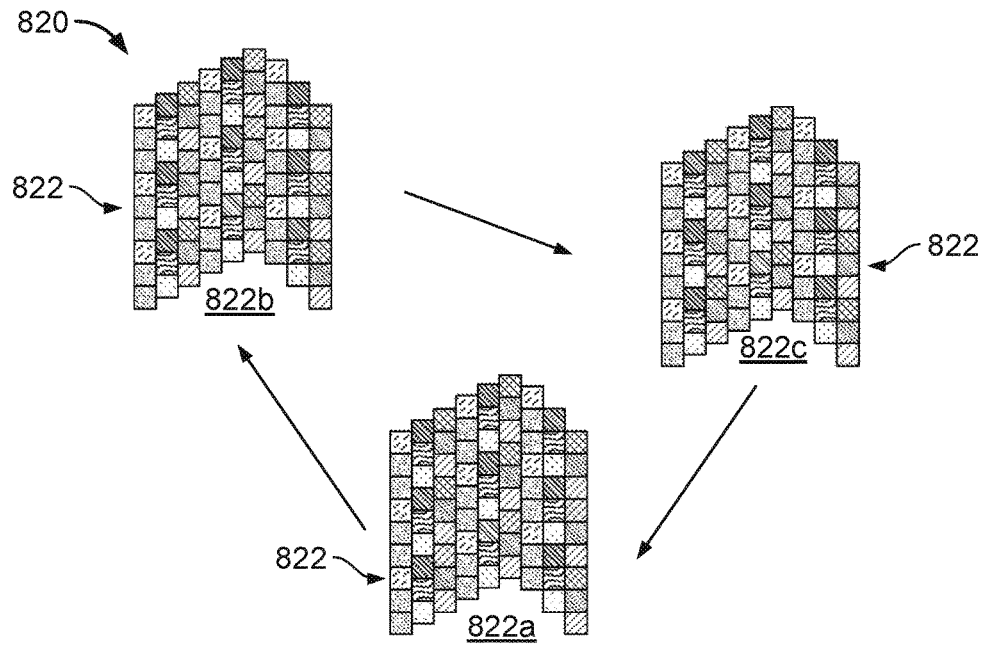
FIGS. 8A and 8B illustrate examples of analog only hopping and analog/digital hopping.
Figure 8B:
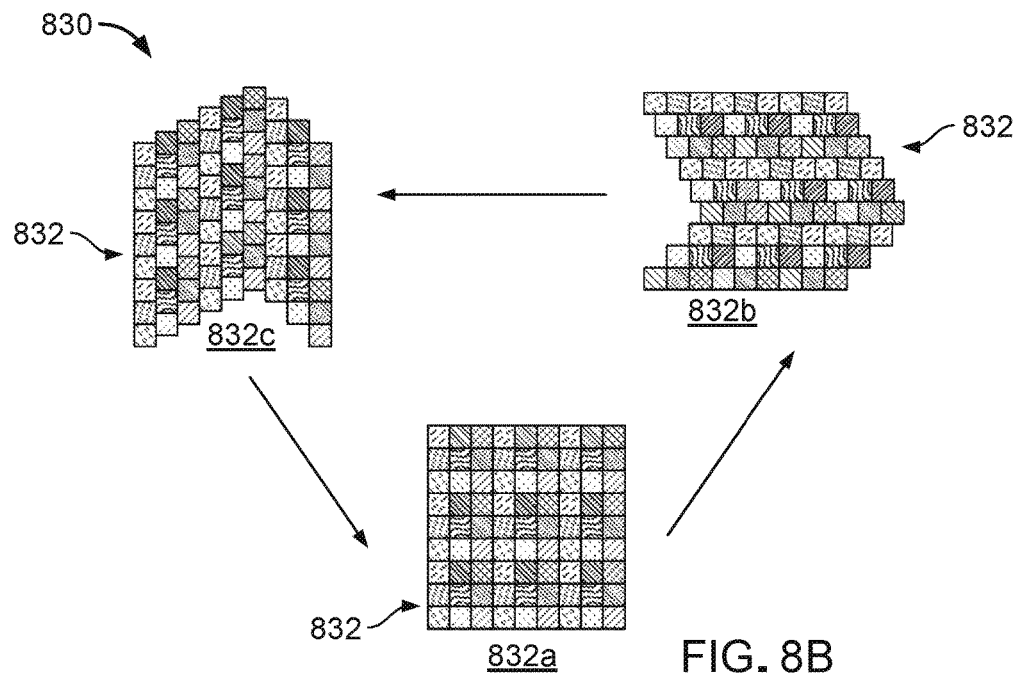

FIGS. 8A and 8B illustrate examples of analog only hopping 820 and analog/digital hopping 830. As shown in FIG. 8A, in analog only hopping, a cluster 822 hops from a first location represented by 822a to a second location represented by 822b, and then to a third location represented by 822c, by changing the orientations of the analog beams. However, there is no change in the relative positions and shapes of the hybrid beams within the cluster, such that the overall shape of the cluster 822 remains unchanged. The example in FIG. 8A further shows that the cluster 822 performs analog only hopping in a scheduled repeating loop, revisiting locations it had covered in previous time intervals. For example, after covering locations 822b and 822c, the cluster 822 returns to provide coverage to location 822a in a new time period.

FIG. 8B shows that in analog/digital hopping, a cluster 832 hops from a first location represented by 832a to a second location represented by 832b, and then to a third location represented by 832c, by changing the orientations of the analog beams. At the same time, the relative positions and shapes of the hybrid beams within the cluster change, such that the overall shape of the cluster 832 in each location is different. For example, the shape of the cluster 832 in location 832a is different from the shape of the cluster 832 in location 832b, which is different from the shape of the cluster 832 in location 832c.

In digital only hopping, the hybrid beamformer processing circuitry on board the spacecraft changes the digital coefficients to result in digital coverage areas hopping within the analog coverage area. In such cases, the relative positions and shapes of the hybrid beams within a cluster change, but the analog coverage area does not change. For example, in some implementations, the digital beamformer 306 changes the digital coefficients for the cluster 702, such that the relative positions of the hybrid beams 702a, 702b and 702c within the cluster 702 changes from one time interval to another. However, the terrestrial region covered by the underlying analog beams in the cluster 702 does not change.

In some implementations, the hopping patterns described above are enabled for any uplink or any downlink communications channel. In such cases, a router in the processor on board the spacecraft facilitates a connection between a downlink and an uplink. In some implementations, the duration of each hop is configurable, e.g., by an operator of the spacecraft, such as a satellite network administrator. In such cases, the time interval of coverage provided by the spacecraft in some regions can be different than the coverage time interval provided in some other regions. In some implementations, the analog coefficients, or digital coefficients, or both, are configurable for each hop. In such cases, the shape and size of a cluster can vary from one hop to another. Further, the relative positions and sizes of the digital beams in a particular cluster can also vary from one hop to another.

In some implementations, the hybrid beams formed by a hybrid beamformer can of four beam types. A first hybrid beam type is full cluster beams, also referred to as "type 1" beams, which are clusters of digital beams that move over the coverage area and that are created using all the panels. In type 1 beams, a cluster includes one analog beam per panel for all the panels in the spacecraft, and digital beams are generated within the footprint of overlapping analog beams in the cluster.

When type 1 beams are used, a cluster can be resized and/or reshaped as required. Type 1 beams support reuse of the frequency bands up to K times, where K is the total number of panels or analog beamformers, with each contributing an analog beam to a cluster. For type 1 beams, up to P full cluster beams can be supported due to frequency reuse, where P=K*number of frequencies. Type 1 beams are used to provide coverage for high capacity areas that are bandwidth limited locally and power limited globally.

Type 1 beams can be used to provide coverage with either a uniform laydown of beams, or a non-uniform laydown of beams. In uniform laydown of type 1 beams, the beam pattern is repeated across all digital beams in each cluster. A uniform or ordered pattern is used within a cluster, e.g., as shown with respect to hybrid beams 314a, 314b, 314c and 314d, but the pattern can vary from one cluster to another cluster. The hybrid or digital beams are distributed across the cluster using a frequency reuse plan. Uniform laydowns can support frequency re-use of the spectrum K times, where K is the number of panels or analog beamformers. Ground terminals can access the spacecraft, e.g., satellite 105, from any location within the cluster.

In non-uniform laydown of type 1 beams, hybrid beams within a cluster can have different arbitrary patterns. In some implementations, non-uniform laydown is used when the exact locations of ground terminals are known. The beam patterns within a cluster are optimized with respect to the demand profile and the geographic distribution of terminals. The frequency reuse depends on the distribution of ground terminals in a cluster.

Figure 9:
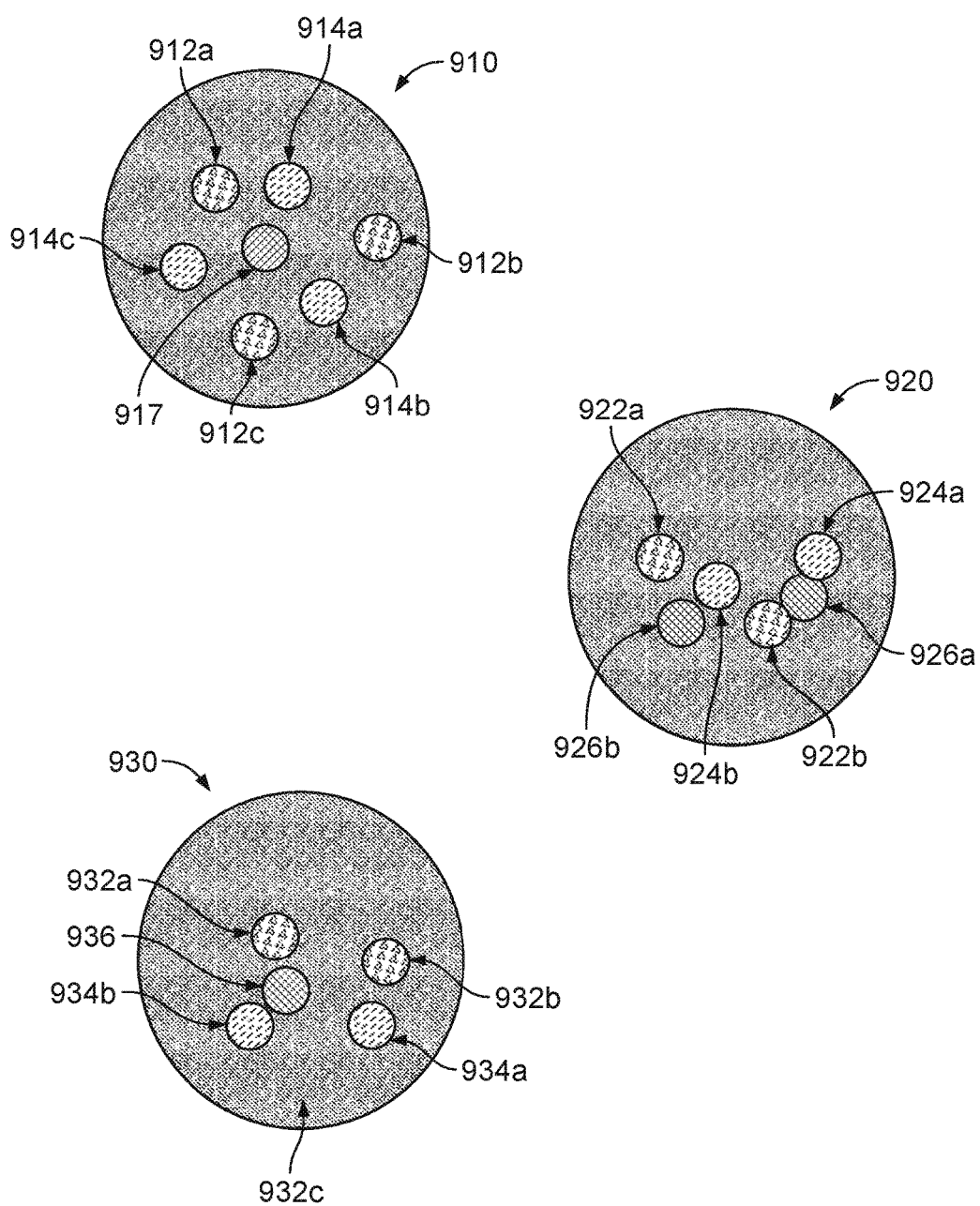
FIG. 9 shows an example use case where type 1 beams are used in clusters in a non-uniform laydown.

FIG. 9 shows an example use case where type 1 beams are used in clusters 910, 920 and 930 in a non-uniform laydown. The clusters 910, 920 and 930 covers users in close proximity within each cluster, as shown. The hybrid beams in each cluster are formed to cover user populations in a non-uniform laydown. The clusters 910, 920 and 930 reuse the respective available frequency spectrum 2.1 times. For example, in cluster 910, hybrid beams 912*a*, 912*b* and 912*c* reuse the same frequency channel three times; hybrid beams 914*a*, 914*b* and 914*c* reuse another frequency channel three times; and hybrid beam 916 uses its own frequency channel. In cluster 920, hybrid beams 922*a* and 922*b* reuse the same frequency channel twice; hybrid beams 924*a* and 924*b* reuse another frequency channel twice; and hybrid beam 926*a* and 926*b* reuse a third frequency channel twice. In cluster 930, hybrid beams 932*a*, 932*b* and 932*c* reuse the same frequency channel three times; hybrid beams 934*a* and 934*b* reuse another frequency channel two times; and hybrid beam 936 uses a third frequency channel.

A second hybrid beam type is partial cluster beams, also referred to as "type 2" beams, which are clusters of beams that move over the coverage area and that are created out of a subset of panels. In type 2 beams, a cluster includes analog beams generated by some of the panels in the spacecraft, and digital beams are generated within the footprint of overlapping analog beams in the cluster. A cluster with type 2 beams can be resized and/or reshaped as needed. Type 2 beams can be used in high capacity areas that are bandwidth limited locally and when only a subset of panels are available for use. This can be the case, for example, when a spacecraft, e.g., satellite 105, is configured to cover a large number of locations using a limited number of beams, such as when the satellite 105 is a Low Earth Orbit (LEO) satellite that is moving in its orbit.

A third hybrid beam type is simple beams, also referred to as "type 3" beams, which are similar to beams formed in an analog direct radiating array that uses the same number of total feeds. However, the type 3 beams can be narrow band. All the panels are used to create one analog beam, and a single digital beam is generated from the analog beam.

A simple beam can be formed into any shape. During a pass over a target region, a simple beam can be reshaped to maintain a constant coverage area and Power Flux Density (PFD) levels. A single satellite spacecraft can support up to K simple beams, where K is the number of panels in the satellite. Each simple beam can completely reuse the frequency spectrum available to the spacecraft. In some cases, simple beams are used in power limited areas that have plenty of frequency spectrum.

A fourth hybrid beam type is split beams, also referred to as "type 4" beams, which are beams with double the beam width of a simple beam. For type 4 beams, the total number of panels is split into groups, and each group of panels is used to create a different beam in a manner similar to that of simple beams. For example, in some implementations, two type 4 beams are created—one from half of the panels, and the second from the other half of the panels. A split beam can be formed into any shape. Similar to the simple beams, split beams can be narrow band beams. A split beam has twice the minimum area of simple beam, but 3 dB less maximum gain than a simple beam. In some cases, split beams are used for spectrum limited satellite views where users are spread out over a wide area. Split beams are also useful for users near nadir of a coverage region where PFD requirements are lower.

Type 3 or simple beams, and type 4 or split beams, are single hybrid beams and not clusters of hybrid beams. Therefore, within the region covered by type 3 beams or type 4 beams, the available frequency is only used once. Accordingly, type 3 or type 4 beams are useful when user locations are packed so close that frequency reuse cannot be supported. However, hardware resources (e.g. panels) that are used for type 3 or type 4 beams can be moved and shared as required as the gain and coverage requirements vary due to movement of the spacecraft over the target regions. In some implementations, any or all of type 1, type 2, type 3 and type 4 beams are used to cover a target area, depending on traffic and coverage requirements.

In some implementations, as the spacecraft, e.g., satellite 105, flies over a target area, hardware resources, e.g., panels of feeds, are transferred among different types of beams and clusters. For example, at one position of the satellite along its orbit, the hybrid beamformer circuitry on board the satellite uses more panels for a first cluster to cover a first region, and a lesser number of panels for a second cluster to cover a second region that is within the footprint of the satellite. As the satellite moves, at a different position of the satellite along its orbit, the on board hybrid beamformer circuitry dynamically reconfigures the assignment of panels and increases the panels for the second cluster, while decreasing the number of panels for the first cluster. In some implementations, the hybrid beamformer achieves the reconfiguration by reassigning some of the panels from generating analog beams for the first cluster to generating analog beams for the second cluster. The dynamic reconfiguration is performed to allow the capacity in each cluster to be continuously maximized.

As a spacecraft, e.g., the satellite 105, moves along its trajectory and thereby across a coverage area on the ground, beam requirements to cover users in the coverage area can change. For example, at one point in the trajectory, users in a particular coverage region can be far away. As the satellite moves closer to the coverage region due to its movement along its orbit, the users in the coverage region gradually become closer to the satellite. When the satellite is directly overhead (referred to as "nadir"), the distance from the satellite to the users in the coverage region is the shortest of all positions along the satellite's orbit (here, positions refer to positions of the satellite along its orbit from where there is line of sight to the coverage region such that the satellite can provide communications coverage). Accordingly, at the nadir, the amount of power and/or antenna gain required by the satellite to close the communications link is the least compared to other positions of the satellite along the orbit. However, the angular area required to cover the users is larger compared to at other positions of the satellite along its orbit. In view of this, when the satellite is at the nadir of a coverage region, the satellite can provide coverage to the region using a lower number of panels, compared to other positions of the satellite along the orbit. By using a lower number of panels, a lower gain but a wider angular area are achieved.

When the satellite is near the horizon relative to the coverage region (e.g., EOC), the distance from the satellite to the users in the coverage region is the longest compared to at other positions of the satellite along its orbit. In this situation, the amount of power and/or antenna gain required to close the communications link is the greatest, compared to at other positions of the satellite along its orbit. At the same time, the angular area required to cover the users in the region is smaller compared to at other positions of the satellite along its orbit. In view of this, when the satellite is at the EOC of a coverage region, the satellite can provide coverage using more panels, compared to other positions of the satellite along the orbit. This results in a higher gain and a narrower angular area.

Since, in some implementations, the satellite provides coverage to multiple regions, as one coverage region moves closer to nadir and another coverage region moves closer to the horizon due to movement of the satellite along its orbit, the hybrid beamformer processing circuitry on board the satellite transfers panels from providing coverage to one area to providing coverage to another area. The transfer of panels is done dynamically and seamlessly so that there is minimal impact to the communications performance experienced by the user on the ground, and such that the underlying air interface (e.g., the communication protocol used to communicate between the satellite and a ground terminal) suffers minimal negative effects.

FIGS. 10A and 10B illustrate examples of dynamic resource transfer in hybrid beamforming to provide communications coverage in multiple regions. FIG. 10A illustrates an example of resource transfer from type 4 beams to type 3 beams in clusters 1012 and 1014, as a satellite, e.g., satellite 105, moves along its orbit such that the satellite footprint changes from footprint 1010 to footprint 1020 and then to footprint 1030.

The footprints 1010, 1020 and 1030 indicate areas on the ground over which the satellite provides coverage, depending on the satellite's position along its orbit. The hybrid beamformer on board the satellite generates hybrid beams to provide communications coverage to two regions 1012 and 1014 within the target area. As shown, in a first time period, when the satellite footprint is 1010, the region 1012 is near the EOC of the footprint, while the region 1014 is near the nadir, e.g., close to being directly under the satellite's orbital position. In this context, a coverage region is at the nadir of the spacecraft when the spacecraft is directly overhead the coverage region. In contrast, a coverage region is at the EOC of the spacecraft when the spacecraft is positioned such that the coverage region is at the boundary of an area covered by the spacecraft's communications footprint in its present position. More resources, e.g., panels, are generally needed closer to EOC to provide coverage with acceptable gain, compared to when the satellite is directly overhead. Accordingly, the hybrid beamformer assigns four panels to cover the region 1012 that is near the EOC, but assigns one panel to cover the region 1014 near the nadir. The hybrid beamformer forms type 4 or split hybrid beams using the four panels in the cluster for region 1012, and forms a type 3 or simple hybrid beam using the one panel in the cluster for region 1014.

Due to movement of the satellite, in a second time period, the footprint of the satellite changes to 1020, as a result of which the nadir moves away from the region 1014, while moving closer to the region 1012. In this position, the satellite can cover region 1012 with a lesser number of panels than when at footprint 1010, but needs more panels to effectively cover region 1014. Accordingly, the hybrid beamformer dynamically reassigns one panel from covering the region 1012 to covering the region 1014. Therefore, in footprint 1020, the hybrid beamformer forms type 4 or split beams using the three panels in region 1012, and also forms type 4 or split beams using the two panels in region 1014.

Due to further movement of the satellite, in a third time period, the footprint of the satellite changes from 1020 to 1030, as a result of which the region 1014 is near the EOC of the satellite footprint, while the region 1012 is close to the nadir. In this position, the satellite can cover region 1012 with the least number of panels than at any other position, since the satellite is almost directly overhead the region 1012. However, the satellite needs the most number of panels to effectively cover region 1014, since the region 1014 is near the EOC. Accordingly, the hybrid beamformer further dynamically reassigns two panels from covering the region 1012 to covering the region 1014, thereby having only one panel for region 1012, but four panels for region 1014. Therefore, in footprint 1020, the hybrid beamformer forms a type 3 or simple beam using the remaining panel in region 1012, but forms type 4 or split beams using the four panels in region 1014.

In the above manner, as the position of a first region changes from EOC to nadir (e.g., region 1012) and the position of a second region changes from nadir to EOC (e.g., region 1014) due to satellite movement, panels are dynamically transferred from the first region to the second region to maximize performance and capacity. This effectively reduces the gain in the first region and expands its coverage to match PFD requirements. At the same time the gain in the second region is improved and the coverage area is narrowed.

FIG. 10B illustrates an example of resource transfer from type 4 beams to type 2 beams in clusters 1022 and 1024, as a satellite, e.g., satellite 105, moves along its orbit such that the satellite footprint changes from footprint 1040 to footprint 1050.

The footprints 1040 and 1050 indicate areas on the ground over which the satellite provides coverage, depending on the satellite's position along its orbit. The hybrid beamformer on board the satellite generates hybrid beams to provide communications coverage to two regions 1022 and 1024 within the target area. As shown, in a first time period, when the satellite footprint is 1040, the region 1022 is at the EOC of the footprint 1040. Since more resources, e.g., panels, are needed closer to EOC to provide coverage with acceptable gain, the hybrid beamformer assigns four panels to the region 1022, and forms type 4 or split beams using the four panels in region 1022.

Due to movement of the satellite, in a second time period, the footprint of the satellite changes to 1050, as a result of which the nadir is closer to the region 1022, while a new region 1024 comes within the satellite footprint at the EOC. In this position, the satellite can cover region 1022 with the least number of panels than at any other position, since the satellite is almost directly overhead the region 1022. However, the satellite needs the most number of panels to effectively cover region 1024 near the EOC. Accordingly, the hybrid beamformer dynamically reassigns three panels from covering the region 1022 to covering the region 1024, thereby having only one panel for region 1022, but three panels for region 1024. In footprint 1050, the hybrid beamformer forms a type 3 or simple beam using the remaining panel in region 1022, but forms type 2 or partial cluster beams using the three panels in region 1024. This effectively reduces the gain in region 1022, but expands its coverage to match PFD requirements, while hardware resources are made available so that the region 1024 can be effectively covered.

Figure 11:
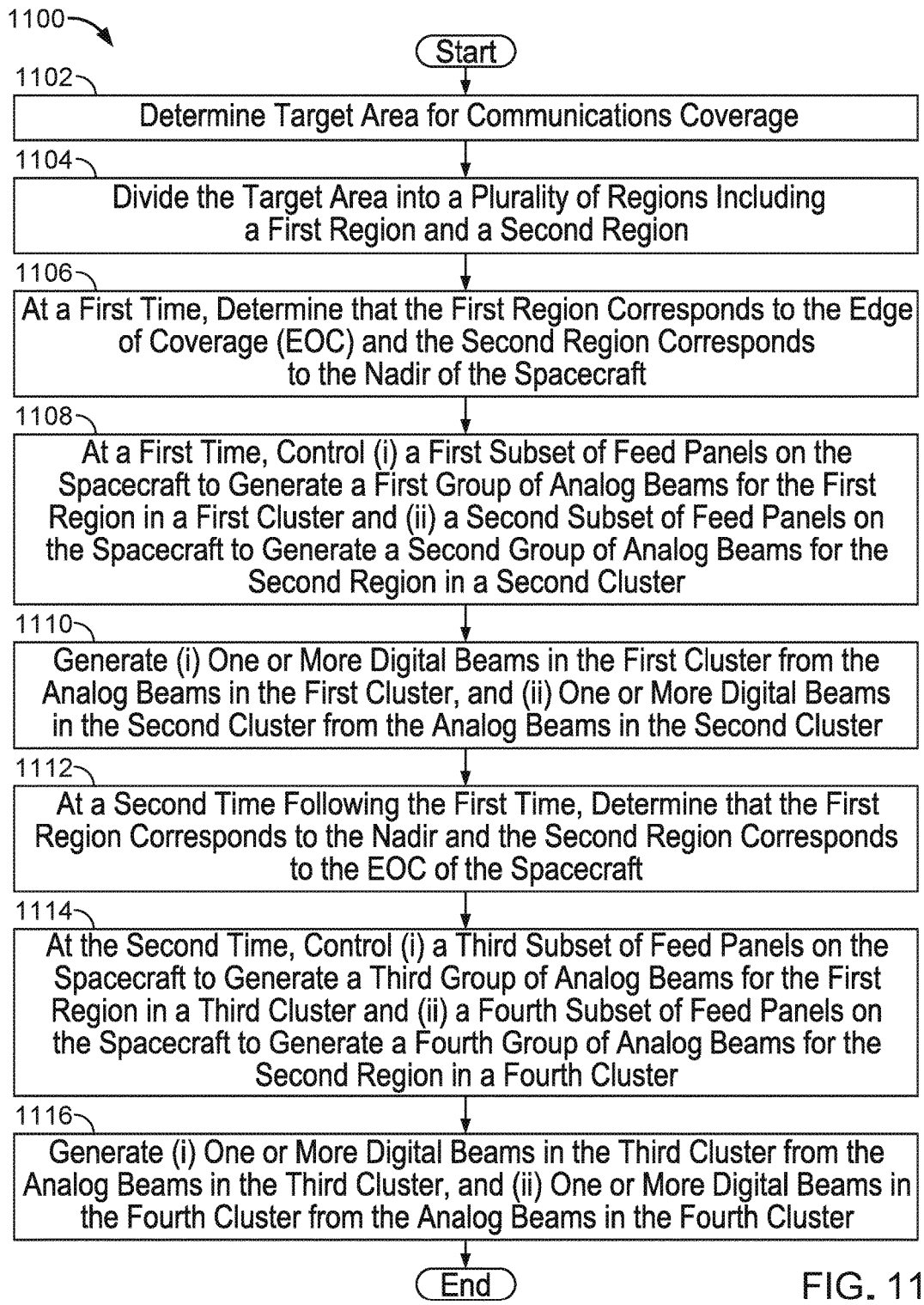
FIG. 11 illustrates an example of a process for resource transfer in hybrid beamforming.

FIG. 11 illustrates an example of a process 1100 for resource transfer in hybrid beamforming. In some implementations, the process 1100 is performed by hybrid beamformer processing circuitry in a spacecraft, e.g., by hybrid beamformer processing circuitry 302, which includes one or more analog beamformer processors 304a, 304b, 304c and 304d, and one or more digital beamformer processors such as 306. As described previously, in some implementations, the spacecraft is an orbiting satellite, such as the satellite 105. Accordingly, the following section describes the process 1100 with respect to the hybrid beamformer processing circuitry 302. However, the process 1100 also can be performed by other processing circuitry configurations, and/or by other types of spacecraft.

In some implementations, the hybrid beamformer processing circuitry executes one or more instructions to perform the process 1100. These instructions are stored in memory, e.g., flash memory, hard disk or some other suitable memory, which is coupled to the hybrid beamformer on board the spacecraft. Alternatively, in some implementations, the instructions are sent to the hybrid beamformer on board the spacecraft from the ground, e.g., through satellite gateway 110 or 125.

In the following sections, the process 1100 is described with respect to two positions of the spacecraft—the nadir and the edge of coverage (EOC). These two positions are mentioned for ease of explanation only. The process 1100 is also applicable to other positions of the spacecraft, e.g., halfway between nadir and EOC, or any location between the nadir and the EOC.

The process 1100 starts at 1102, in which a target area for communications coverage is determined. For example, the hybrid beamformer processing circuitry 302 determines an area on the Earth's surface for communications coverage, such as target area 400. In some implementations, information about the target area, e.g., coordinates of the area, are sent to the hybrid beamformer on board the spacecraft, e.g., as part of telecommunications commands from ground stations to the satellite 105 via the satellite gateways 110 or 125.

At 1104, the hybrid beamformer divides the target area into a plurality of regions, including a first region and a second region. For example, the hybrid beamformer processing circuitry 302 divides the target area into a plurality of regions. In some implementations, the plurality of regions includes the regions 1012 and 1014, or the regions 1022 and 1024. In some implementations, the plurality of regions is determined based on the presence of user population in the target area, or the communications requirement in various regions, or both. For example, only regions in the target area where users are present are selected in some cases, while uninhabited areas are avoided. Additionally or alternatively, in some cases, areas where communications equipment are present, such as data gathering apparatus, or areas where users are predicted to be present within a known time period, such as a shipping channel in an ocean, are selected in some cases.

At 1106, the hybrid beamformer determines, at a first time, that the first region corresponds to the edge of coverage (EOC) and the second region corresponds to the nadir of the spacecraft. For example, in a first time interval, the satellite 105 is at an orbital position that corresponds to the footprint 1010. In this position of the satellite 105, the hybrid beamformer processing circuitry 302 on board the satellite determines that the region 1012 is near the EOC of the satellite footprint, while the region 1014 is near the nadir of the satellite footprint, i.e., almost directly under the satellite's position.

At 1108, at the first time, the hybrid beamformer controls (i) a first subset of feed panels on the spacecraft to generate a first group of analog beams for the first region in a first cluster and (ii) a second subset of feed panels on the spacecraft to generate a second group of analog beams for the second region in a second cluster. For example, in the first time interval, when the satellite 105 is in the orbital position corresponding to footprint 1010, the hybrid beamformer processing circuitry 302 assigns four panels to cover the region 1012 and one panel to cover the region 1014. The hybrid beamformer 302 uses the four panels or analog beamformers to generate analog beams in a first cluster for the region 1012, and uses the one panel or analog beamformer to generate analog beams in a second cluster for the region 1014.

At 1110, the hybrid beamformer generates (i) one or more digital beams in the first cluster from the analog beams in the first cluster, and (ii) one or more digital beams in the second cluster from the analog beams in the second cluster. For example, in the first time interval, after generating the analog beam in the first cluster for the region 1012, the hybrid beamformer processing circuitry 302 combines the analog beams in the first cluster to generate one or more digital beams to cover the region 1012. Similarly, after generating the analog beam corresponding to second cluster for the region 1014, the hybrid beamformer processing circuitry 302 combines the analog beams in the second cluster to generate one or more digital beams to cover the region 1014. In this manner, the hybrid beamformer forms hybrid beams in the first and second clusters for the regions 1012 and 1014 respectively. As described previously, in some implementations, the hybrid beamformer forms split beams in the region 1012, and a simple beam in the region 1014.

At 1112, at a second time following the first time, the hybrid beamformer determines, that the first region corresponds to the nadir and the second region corresponds to the EOC of the spacecraft. For example, in a second time interval, the satellite 105 is at an orbital position that corresponds to the footprint 1030 (having moved through the footprint 1020 position in an intermediate time interval). In this position of the satellite 105, the hybrid beamformer processing circuitry 302 on board the satellite determines that the region 1012 is near the nadir of the satellite footprint 1030, while the region 1014 is near the EOC of the satellite footprint 1030.

At 1114, at the second time, the hybrid beamformer controls (i) a third subset of feed panels on the spacecraft to generate a third group of analog beams for the first region in a third cluster and (ii) a fourth subset of feed panels on the spacecraft to generate a fourth group of analog beams for the second region in a fourth cluster. For example, in the second time interval, when the satellite 105 is in the orbital position corresponding to footprint 1030, the hybrid beamformer processing circuitry 302 dynamically reassigns panels from covering the region 1012 to cover the region 1014, since the former region requires less panels for coverage near the nadir but the latter region requires more panels for coverage near the EOC, as described previously. In some implementations, the hybrid beamformer 302 assigns one panel to cover the region 1012, but assigns four panels to cover the region 1014, where some of these four panels were used to provide coverage in the region 1012 earlier in the first time interval. The hybrid beamformer 302 uses the one panel or analog beamformer to generate analog beams in a third cluster for the region 1012, and uses the four panels or analog beamformers to generate analog beams in a fourth cluster for the region 1014. In some implementations, the number of analog beams in the third cluster is different from the number of analog beams in the first cluster to cover the same region 1012, and the number of analog beams in the fourth cluster is different from the number of analog beams in the second cluster to cover the same region 1014. However, in other implementations, the number of analog beams in the third cluster is same from the number of analog beams in the first cluster, and the number of analog beams in the fourth cluster is same as the number of analog beams in the second cluster.

At 1116, the hybrid beamformer generates (i) one or more digital beams in the third cluster from the analog beams in the third cluster, and (ii) one or more digital beams in the fourth cluster from the analog beams in the fourth cluster.

For example, in the second time interval, after generating the analog beam in the third cluster for the region 1012, the hybrid beamformer processing circuitry 302 combines the analog beams in the third cluster to generate one or more digital beams to cover the region 1012. Similarly, after generating the analog beam corresponding to fourth cluster for the region 1014, the hybrid beamformer processing circuitry 302 combines the analog beams in the fourth cluster to generate one or more digital beams to cover the region 1014. In this manner, the hybrid beamformer forms hybrid beams in the third and fourth clusters for the regions 1012 and 1014 respectively. As described previously, in some implementations, the hybrid beamformer forms a simple beam in the region 1012, and split beams in the region 1014. Accordingly, the number of hybrid beams in the third cluster is different from the number of hybrid beams in the first cluster to cover the same region 1012, and the number of hybrid beams in the fourth cluster is different from the number of hybrid beams in the second cluster to cover the same region 1014. In the above manner, the hybrid beamformer processing circuitry 302 on board the satellite 105 transfers hardware resources, e.g., panels from covering one region to covering a different region as the relative positions of these regions with respect to the satellite changes due to the satellite's movement.

As mentioned previously, the process 1100 is described above with respect to two positions of the spacecraft—the nadir and the edge of coverage (EOC), which two positions are mentioned for ease of explanation only. The process 1100 is also applicable to other positions of the spacecraft, e.g., halfway between nadir and EOC, or any location between the nadir and the EOC. The number of panels that are transferred from covering a region that moves closer to the spacecraft (i.e., towards the nadir) to covering a region that moves farther away from the spacecraft (i.e., towards the EOC) due to the motion of the spacecraft, varies depending on the position of the spacecraft along its trajectory. Certain locations require different power and footprints than other locations. As the spacecraft moves from the proximity of a first of such locations to a second of such locations, resource transfer, i.e., transfer of one or more panels, are triggered to best address the new and different power and footprint needs of the two locations. Changing from one relative location having a first set of communication characteristics or attributes for servicing that area to another location having a second set of communication characteristics or attributes for servicing that area triggers the spacecraft to perform resource transfer such that a different number of panels would be advantageous to properly service the locations as their locations change relative to the satellite.

Figure 12:
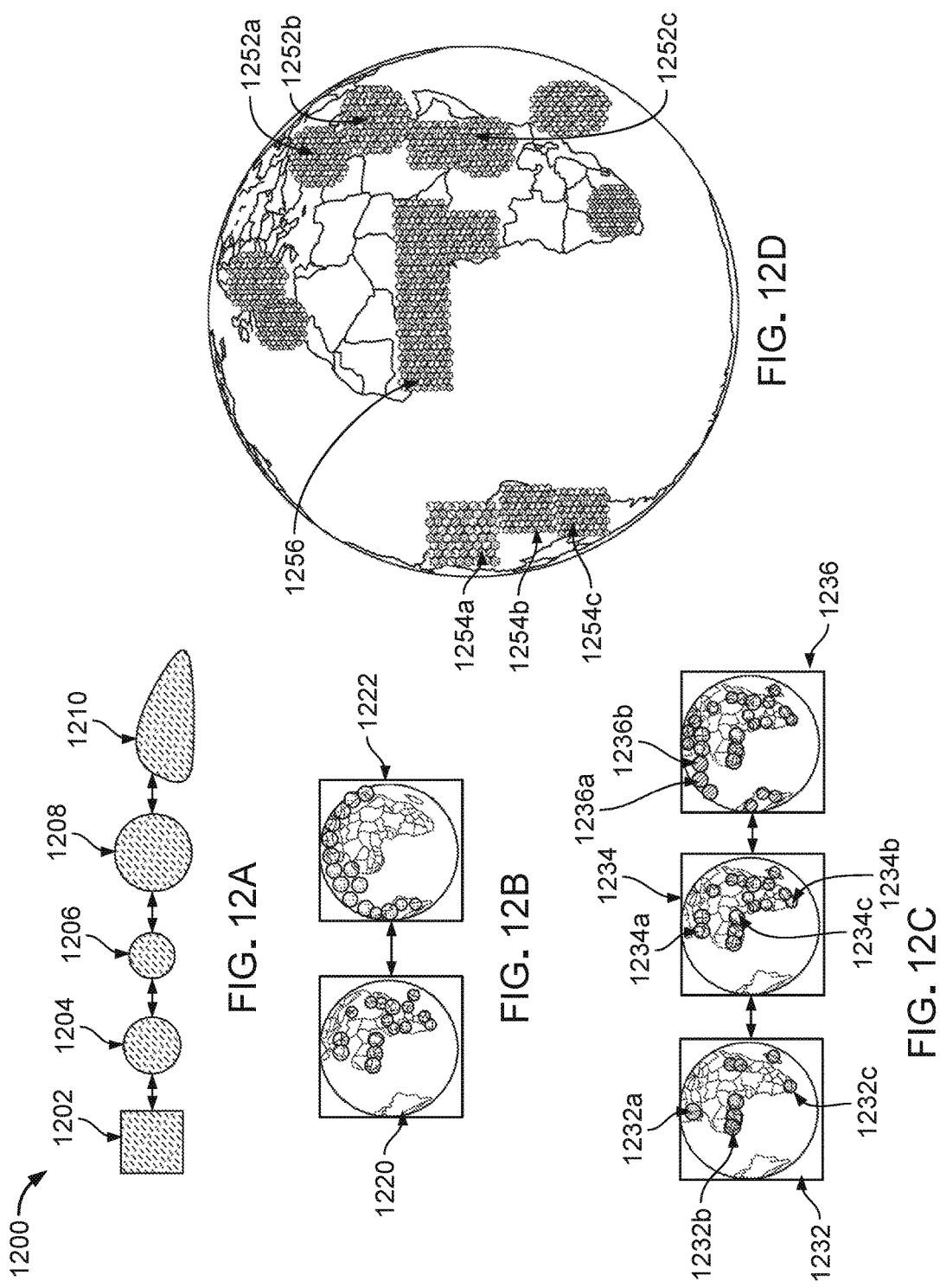
FIGS. 12A-12D illustrate examples of coverage flexibility provided by a spacecraft using hybrid beamforming.

As described in the above sections, a spacecraft, e.g., satellite 105, can dynamically provide coverage flexibility while in orbit. FIGS. 12A-12D illustrate examples of coverage flexibility provided by a spacecraft, e.g., satellite 105, using hybrid beamforming. In some cases, a cluster is resized—either increased in size or decreased in size. Additionally or alternatively, a cluster can be reshaped. FIG. 12A shows an example of a cluster 1200 that is resized and/or reshaped at different time intervals of coverage. The cluster is reshaped from a first square shape 1202 to a second circular shape 1204. The cluster is resized in the circular shape among sizes 1204, 1206 and 1208 at various time intervals. The cluster is further reshaped from a circular shape 1208 to an arbitrary shape 1210 at another time interval. In some implementations, when a cluster is resized or reshaped, there is a change in the bandwidth capacity of the cluster. For example, when a cluster is decreased in size, the bandwidth capacity can be reduced. Alternatively, when a cluster is increased in size, the bandwidth capacity can be increased.

In some implementations, the hybrid beamformer moves clusters in orbit to any location across the Earth's surface. FIG. 12B shows an example of a group of clusters moved from a first configuration 1220 to a second configuration 1222. In some implementations, each cluster in the configuration 1220 or 1222 includes a large number (e.g., hundreds) of hybrid beams. In some implementations, the frequency band is reused many times in each cluster. In some implementations, each cluster includes a single polarization.

In some implementations, the hybrid beamformer increases the number of clusters dynamically. FIG. 12C shows an example of increasing a number of clusters between groups 1232, 1234 and 1236. At a first time interval, the hybrid beamformer 312 generates a first number of clusters, including clusters 1232a, 1232b and 1232c, in group 1232. In some implementations, the clusters 1232a, 1232b and 1232c have dual polarization and double the capacity of clusters in the other groups 1234 and 1236.

At a second time interval, in group 1234, the hybrid beamformer 312 generates a second number of clusters, including clusters 1234a, 1234b and 1234c. Subsequently, at a third time interval, in group 1234, the hybrid beamformer 312 splits some of the clusters from group 1232 to generates a third group of clusters, such as clusters 1236a and 1236b. In some implementations, a cluster from the second group is split to form a number of clusters in the third group. The number can be two or four, among others. In some implementations, the clusters 1236a and 1236b in the third group have less gain and less frequency reused compared to the clusters, e.g., 1234a, 1234b and 1234c, in the second group. In some implementations, the clusters in the first, second and third groups can be generated by time hopping across the Earth's surface during different time intervals, as the satellite 105 moves in its orbit.

In some implementations, the hybrid beamformer reconfigures a single cluster as multiple clusters to create clusters by splitting. For example, in some cases, the hybrid beamformer forms two clusters by using a subset of the analog beamformer panels for each cluster, as described previously. For a P×Q array of beamformer panels (P×Q are integers>0), the hybrid beamformer generates one cluster using P/2×Q panels and the second cluster using the other P/2×Q panels. In a similar manner, the hybrid beamformer can use other subsets of panels to create multiple sets of clusters out of hardware resources that were designed for a single high gain cluster.

In some implementations, the hybrid beamformer can change the orientations of the analog beamformers, relative to the Earth's surface. In such cases, arbitrarily steerable clusters can be formed. FIG. 12D shows an example of steerable clusters, e.g., 1252a, 1252b, 1252c, 1254a, 1254b, 1254c and 1256, formed using hybrid beamforming. As shown, the clusters can be circular in shape, e.g., clusters 1252a, 1252b and 1252c. Additionally or alternatively, the clusters can be square in shape, e.g., clusters 1254a, 1254b and 1254c. Additionally or alternatively, the clusters can be any arbitrary shape, e.g., cluster 1256, where a cluster is shaped to match the region to be covered. The clusters 1252a, 1252b, 1252c, 1254a, 1254b, 1254c and 1256 can be steered to any location on the Earth's surface.

The hybrid beamformer can form a larger number of clusters at reduced/lower gain. Additionally or alternatively, the hybrid beamformer can cover larger areas, or shaped areas, at reduced gain. The hybrid beamformer also can form smaller clusters.

As described previously, a target area can be divided into regions and each region can be covered by a cluster of hybrid beams. In some implementations, the clusters of hybrid beams covering regions in a target area are arranged in rows and columns to provide contiguous coverage in the target area. In some implementations, rows of clusters are shifted horizontally, or columns of clusters are shifted vertically, or both, to effectively cover a target area, e.g., a target area that is of arbitrary shape.

Figure 13:
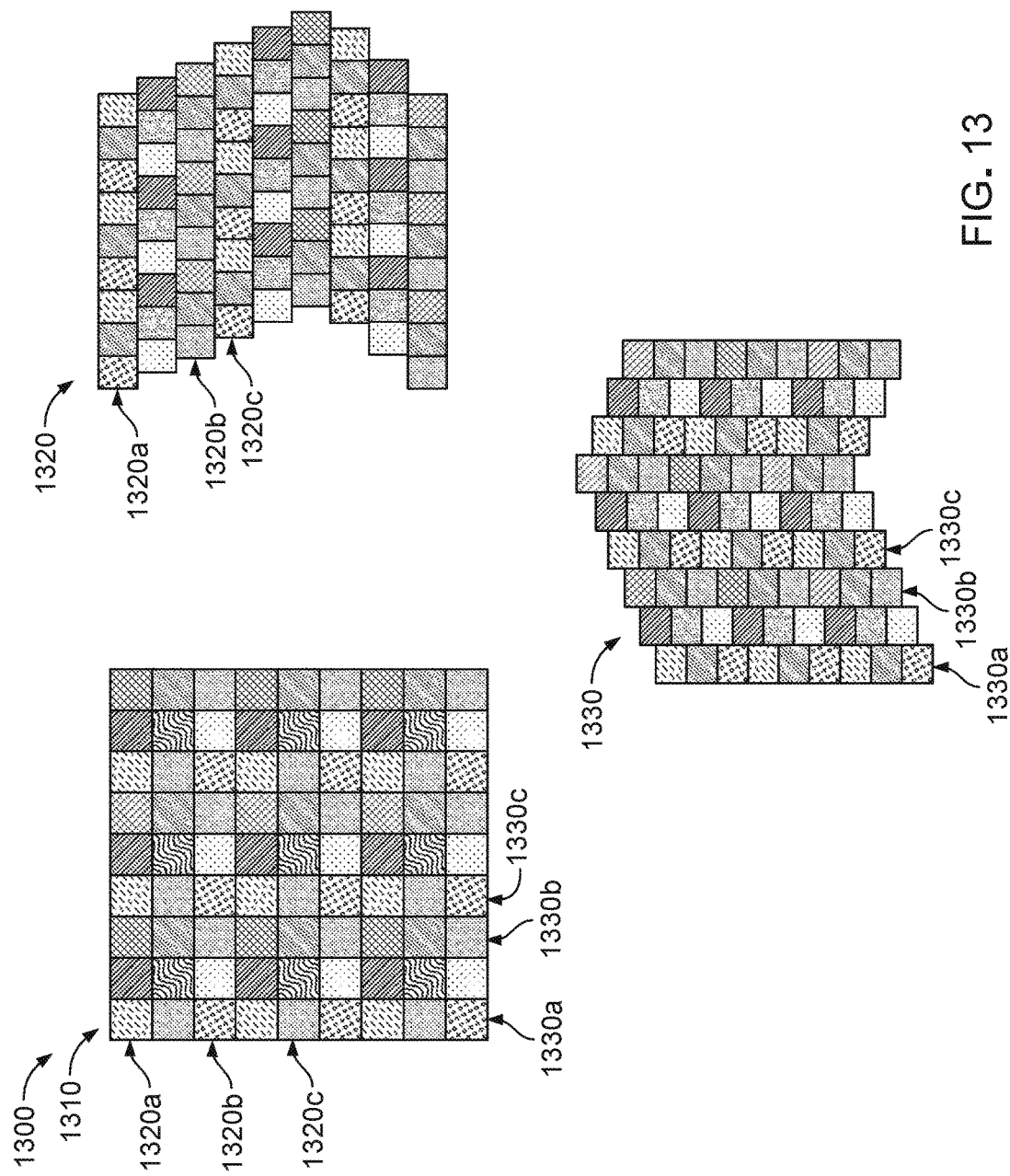
FIG. 13 illustrates an example of a group of clusters shifted horizontally, or vertically, or both, to cover a target area.

FIG. 13 illustrates an example of a group of clusters 1300 shifted horizontally, or vertically, or both, to cover a target area. A hybrid beamformer, e.g., the hybrid beamformer processing circuitry 302, can cover a target area by forming a group of clusters of hybrid beams, such as the group of clusters 1300. Individual clusters in the group are arranged in rows and columns, e.g., rows 1320a, 1320b and 1320c, and columns 1330a, 1330b and 1330c. In some implementations, the rows and columns are arranged in a square configuration, e.g., configuration 1310, to cover the target area.

In some implementations, one or more rows of clusters are shifted horizontally to cover the target area. For example, in configuration 1320, rows 1320a, 1320b and 1320c, among others, are shifted horizontally. The vertical arrangement of clusters, while adjusted by the row shifting, remains a vertical arrangement. Accordingly, the arrangement of the clusters in one or more columns are maintained, but the heights of the columns can be different.

In some implementations, one or more columns of clusters are shifted vertically to cover the target area. For example, in configuration 1330, and columns 1330a, 1330b and 1330c, among others, are shifted vertically. The horizontal arrangement of clusters, while adjusted by the column shifting, remains a horizontal arrangement. Accordingly, the arrangement of the clusters in one or more rows are maintained, but the widths of the rows can be different.

In some implementations, both rows and columns are shifted, respectively horizontally and vertically. There can be slight differences in performance depending on horizontal or vertical shift. For example, the gain can change by a small degree. Generally, the performance remains nearly the same as in the case of no horizontal or vertical shift. Frequency reuse is the same and does not change due to horizontal or vertical shift.

In some implementations, hybrid beams in a cluster that formed using one analog beam from each analog beamformer panel have the maximum gain. However, in some implementations, the hybrid beams in a cluster are not formed using analog beams from all panels on the array.

If the analog beamformer panels are arranged in a P×Q array, then the maximum frequency reuse of a cluster is P times Q (P columns by M rows of analog beamforming panels). In some implementations, to generate hybrid beams within a cluster at a single frequency, hybrid beams within a predetermined range of a line parallel to the rows in the cluster are limited to a length within a preselected R degrees, and hybrid beams within a predetermined range of a line parallel to the panel columns are limited to a length within a preselected S degrees (where R and S are natural numbers). R is the distance between side lobes that appear in the horizontal direction, while S is the distance between side lobes that appear in the vertical direction. In some implementations, side lobes that are difficult to suppress appear along the vertical axis. Accordingly, the range limit S degrees is selected to avoid co-channel beam interference with the side lobes in the vertical direction.

Figure 13A:
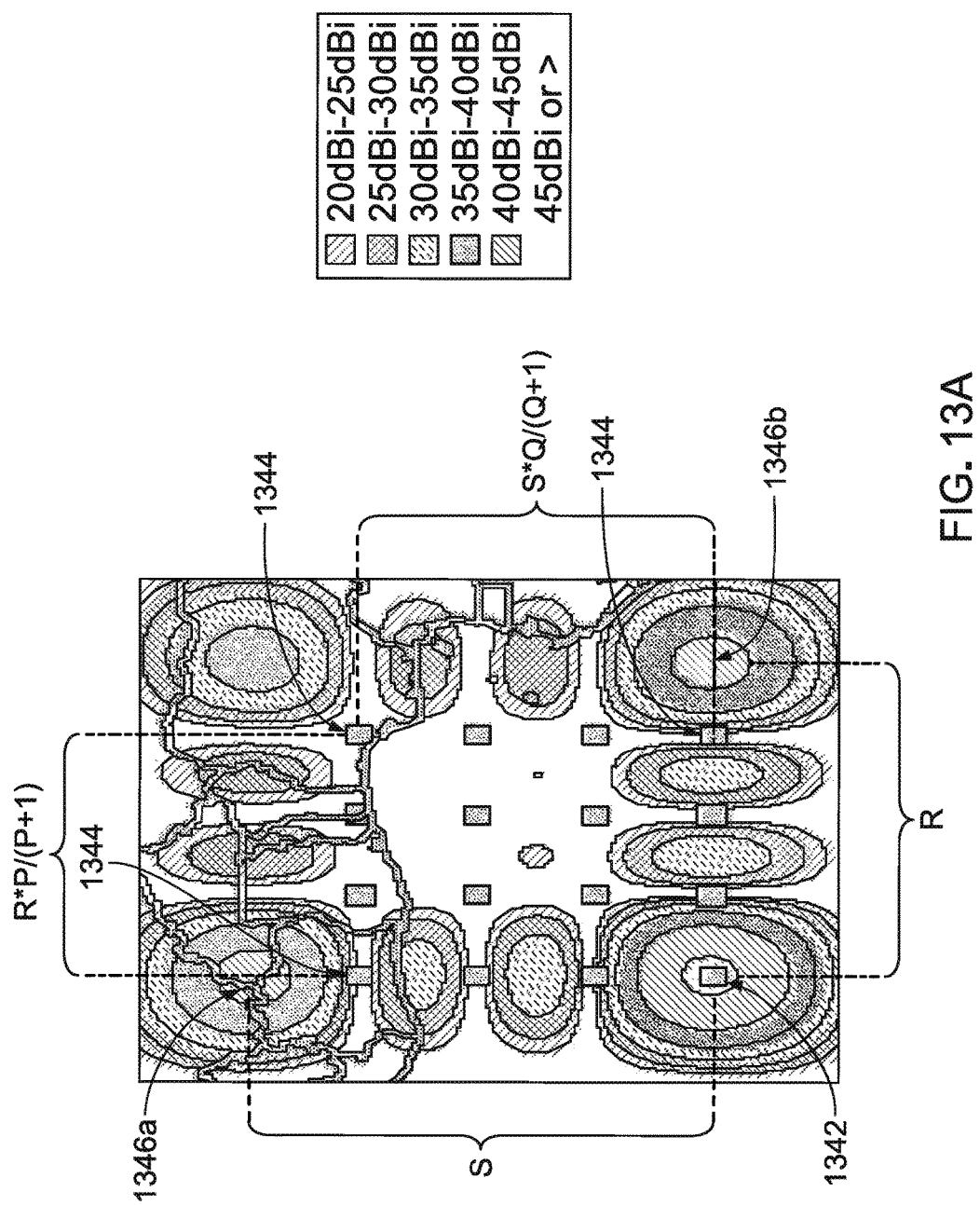
FIG. 13A illustrates a graphical example of signal spread of co-channel hybrid beams and corresponding side lobes.

FIG. 13A illustrates a graphical example of signal spread of co-channel hybrid beams, e.g., hybrid beams 1342 and 1344, and corresponding side lobes, e.g., side lobes 1346a and 1346b. Hybrid beam 1342 is a desired hybrid beam in a cluster, while co-channel hybrid beams, e.g., hybrid beams that share the same frequency channel as hybrid beam 1342, are collectively indicated as 1344. Side lobes 1346a and 1346b are formed by the co-channel beams. As shown, the desired beam 1342 is R degrees removed from the side lobe 1346b in the horizontal direction, and S degrees removed from the side lobe 1346a in the vertical direction.

As shown in FIG. 13A, in some implementations, up to P co-channel hybrid beams are distributed along a horizontal line parallel to the cluster rows over a length no more than R degrees and nominally to around $R*P/(P+1)$ degrees. In some implementations, up to Q co-channel hybrid beams are distributed along a vertical line parallel to the cluster columns over a length no more than S degrees and nominally to around $S*Q/(S+1)$ degrees. In the example shown in FIG. 13A, P=Q=4.

Horizontal lines of hybrid beams can be shifted with respect to each other as long as the hybrid beams do not violate the line segment length rules. Similarly, vertical lines of hybrid beams can be shifted with respect to each other as long as the hybrid beams do not violate the line segment length rules. In some implementations, beam distributions are not uniformly distributed in a row or in a column.

Multiple frequencies are configured in a manner similar to the above. Once the hybrid beams are generated, the rows and columns can be shifted to fill in gaps, if any, between the hybrid beams. FIG. 13 shows examples of hybrid beams formed with the above principles. In some implementations, clusters of hybrid beams have gaps between the hybrid beams, or a non-uniform arrangement of beams, or both.

FIGS. 14A-14E illustrate an example of covering regions in a target area by hybrid beamforming using groups of clusters. As shown in FIG. 14A, at a first time, a hybrid beamformer, e.g., the hybrid beamformer 302 on board a spacecraft, such as satellite 105, forms a plurality of analog beams from the analog beamformer panels in the spacecraft. For example, the hybrid beamformer 302 forms analog beams 1410a, 1410b and 1410c, among others, to cover a region in the target area. The analog beams are formed using some or all of the analog beamformers 304a, 304b, 304c and 304d. In some implementations, one beam from each analog beamformer is positioned and shaped over a desired coverage region in the target area. In other implementations, different numbers of beams from different analog beamformers are positioned and shaped over the desired coverage region.

The hybrid beamformer 302 feeds the analog beams to one or more digital beamformer processors, e.g., digital beamformer 306, which generates digital beams by combining the analog beams, as described previously. FIG. 14B shows a cluster 1420 of digital beams that is generated from the analog beams 1410a, 1410b and 1410c to cover a desired region in the target area. The digital beams in the cluster 1420 are arranged in rows, e.g., 1420a, 1420b and 1420c, among others, and columns, e.g., 1430a, 1430b and 1430c, among others.

In some implementations, the width of any row in a cluster is less than a preselected row width (e.g., R degrees), and the height of any column is less than a preselected column height (e.g., S degrees). As noted previously, in some implementations, the column height is determined based on a distance between side lobes that appear in the horizontal direction. The column height is selected to minimize the interference from the side lobes. For example, as shown in FIG. 13A, if the vertical distance between side lobes is within S degrees, then in some implementations, up to Q co-channel hybrid beams are distributed along a vertical column over a height no more than S degrees and nominally to around S*Q/(S+1) degrees. Similarly, in some implementations, the row width is determined based on a distance between side lobes that appear in the horizontal direction. The row width is selected to minimize the interference from the side lobes. For example, as shown in FIG. 13A, if the horizontal distance between side lobes is within R degrees, then in some implementations, up to P co-channel hybrid beams are distributed in a row over a width no more than R degrees and nominally to around R*P/(P+1) degrees.

One or more of the rows are shifted horizontally, as shown in FIG. 14B, to conform to boundaries of the coverage region. Similarly, one or more columns can be shifted vertically to conform to the coverage boundaries.

After generating the cluster 1420 of hybrid beams to cover one desired region in the target area, the hybrid beamformer 302 generates hybrid beams to cover the next desired region in the target area. For example, as shown in FIG. 14C, the hybrid beamformer 302 generates analog beams 1440a, 1440b and 1440c, among others, which are steered or oriented to cover a second region in the target area that is adjacent to the region covered by the cluster 1420. In some implementations, the analog beams 1440a, 1440b and 1440c correspond to second beams generated by each analog beamformer panel. In some implementations, the analog beams 1440a, 1440b and 1440c are time hopped versions of analog beams in another cluster, e.g., analog beams 1410a, 1410b and 1410c. In some implementations, the analog beams, e.g., 1440a, 1440b and 1440c, in the next region operate at a different hop time, polarization, or frequency, or any suitable combination of these parameters, compared to the analog beams in the next region, e.g., 1410a, 1410b and 1410c, to avoid interference from side lobes from the cluster 1420.

The hybrid beamformer 302 subsequently generates digital beams by combining the analog beams 1440a, 1440b and 1440c, among others, as described previously. FIG. 14D shows a cluster 1440 of digital beams that is generated from the analog beams 1440a, 1440b and 1440c, among others to cover the desired region adjacent to the region covered by the cluster 1420. The digital beams in the cluster 1440 are also arranged in rows and columns, with the rows and columns in the cluster 1440 shifted to fit with the rows and columns in the cluster 1420. In some implementations, rows and columns are shifted such that co-channel hybrid beams (e.g., hybrid beams using the same frequency channel) are adjacent. In some implementations, neighboring clusters use different time hops, polarizations and/or time slots to avoid interference from side lobes generated by adjacent clusters.

As shown in FIG. 14D, in some cases, the next boundary (e.g. coastline) of the target area is reached when forming a cluster, e.g., cluster 1440. In such situations, in some implementations, the hybrid beamformer 302 stretches of squashes hybrid beams across all the clusters while meeting row height and/or column height constraints described with respect to FIG. 14B. For example, FIG. 14D shows that the hybrid beams in clusters 1420 and 1440 stretched and squashed to reach the opposite coastlines. The hybrid beamformer 302 can also eliminate some hybrid beams within one or more clusters to fully cover the target area.

Alternatively, in some implementations, the hybrid beamformer 302 overlaps adjacent clusters without squashing either cluster. As indicated above, hybrid beams in two adjacent clusters do not interfere with each other due to differences in one or more of frequency, time slot or polarization. Further, overlapping clusters preserve full capacity of each cluster. Although FIG. 14D shows that the clusters are stretched/squashed, or overlapped, in the horizontal direction, a similar technique can also be applied in the vertical direction.

The hybrid beamformer 302 repeats the process of forming clusters of digital beams until all desired regions within the target area are covered. For example, as shown in FIG. 14E, after forming clusters 1420 and 1440, the hybrid beamformer covers a third desired region with a cluster 1450, as described with respect to FIGS. 14A-14D.

Figure 15A:
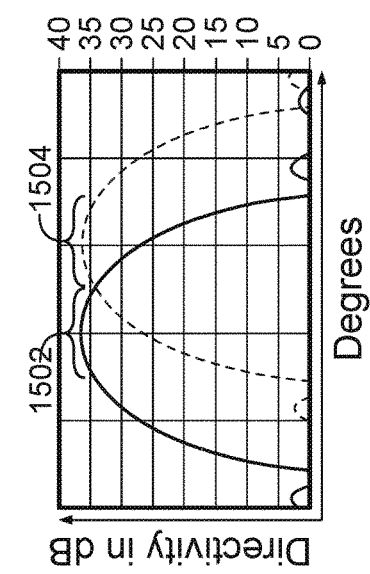
FIGS. 15A-15C illustrate an example of sharing frequency spectrum between adjacent clusters in hybrid beamforming.
Figure 15B:
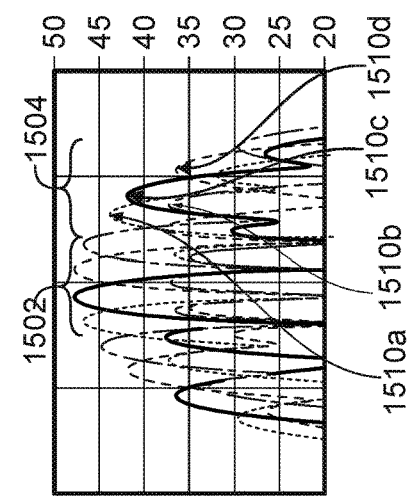
Figure 15C:
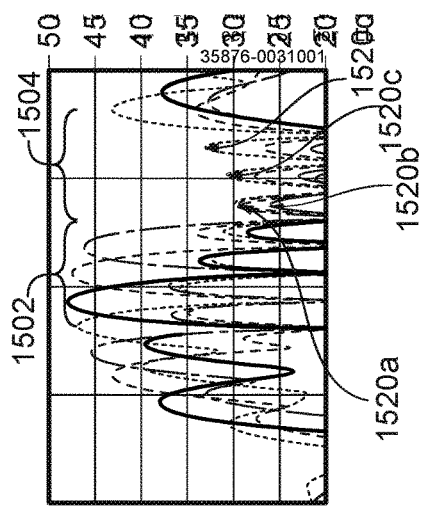

As noted above, in some implementations, neighboring clusters operate using different frequency spectra, time slots, or polarization, or a suitable combination of these parameters, to avoid unwanted interference from side lobes that are generated in the adjacent clusters. However, in some implementations, neighboring clusters share the same frequency spectrum to suppress interference from side lobes. FIGS. 15A-15C illustrate an example of sharing frequency spectrum between adjacent clusters in hybrid beamforming. Each of FIGS. 15A, 15B and 15B presents a graph showing pattern cuts of a number of co-channel beams in a first cluster that is indicated by 1502. In the example shown, the number of co-channel beams is four. In each graph, the X-axis represents the angular cut (in degrees) of a satellite (e.g., satellite 105) beam pattern on the Earth's surface due to orientation of the satellite with respect to the Earth; and the Y-axis represents beam directivity in dB (decibels). In some implementations, the Y-axis represents gain in dBi (decibels relative to isotropic). FIG. 15A shows analog beams created in each of two clusters 1502 and 1504 at different frequencies that are assigned to each cluster.

FIG. 15B shows hybrid beams that are created for cluster 1502 by applying digital beamforming coefficients to analog beams generated for cluster 1502 by analog beamformers. In the example shown, the analog beams for cluster 1502 are generated from 16 analog beamformer panels, and the hybrid beams are formed from all the analog beams in cluster 1502. The formation of hybrid digital beams for cluster 1502 creates side lobes, e.g., side lobes 1510a, 1510b, 1510c and 1510d, in neighboring cluster 1502. In this context, the side lobes are digital grating lobes formed in a cluster, e.g., cluster 1502, that interfere with the hybrid beams in a neighboring cluster, e.g., cluster 1504.

As mentioned previously, to avoid interference from side lobes, in some implementations, clusters 1502 and 1504 use different frequency spectra. However, in some implementations, the effect of side lobes is mitigated by reusing frequencies across neighboring clusters. This is achieved by forming the digital beams for a first cluster using analog beams that are assigned to the first cluster and also analog beams that are assigned to neighboring clusters of the first cluster.

FIG. 15C shows hybrid beams that are formed for cluster 1502 by applying digital beamforming coefficients for cluster 1502 to the analog beams generated for both clusters 1502 and 1504. In the example shown, each analog beamformer panel is used twice—once to generate an analog beam for cluster 1502 and then again to generate an analog beam for cluster 1504. Hybrid beamforming for cluster 1502 is achieved with twice the number of analog beams as compared to the case shown in FIG. 15B, using frequencies that are shared between clusters 1502 and 1504. In a similar manner, hybrid beamforming for cluster 1504 is achieved by combining the analog beams for both clusters 1502 and 1504, using frequencies that are shared between clusters 1502 and 1504.

The side lobes formed for in cluster 1502 destructively interfere in phase with the side lobes formed in cluster 1504 due to use of the same frequency bands in the two neighboring clusters. This results, for each cluster, in lower gain of the side lobes, which is within an acceptable threshold for interference in each cluster. For example, as shown in FIG. 15C, side lobes 1520a, 1520b, 1520c and 1520d are formed in cluster 1502 when the hybrid beams are generated by combing the analog beams for clusters 1502 and 1504 using the frequencies shared between the two clusters. The directivity or gain of the side lobes 1520a, 1520b, 1520c and 1520d are significantly less than the directivity or gain of the side lobes 1510a, 1510b, 1510c and 1510d. Accordingly, the interference caused by the side lobes 1520a, 1520b, 1520c and 1520d in cluster 1504 is less compared to the interference caused by the side lobes 1510a, 1510b, 1510c and 1510d. In some implementations, the interference from side lobes 1520a, 1520b, 1520c and 1520d is below an interference threshold for cluster 1504, and therefore the adverse effects of the side lobes 1520a, 1520b, 1520c and 1520d are within acceptable levels.

Figure 16C:
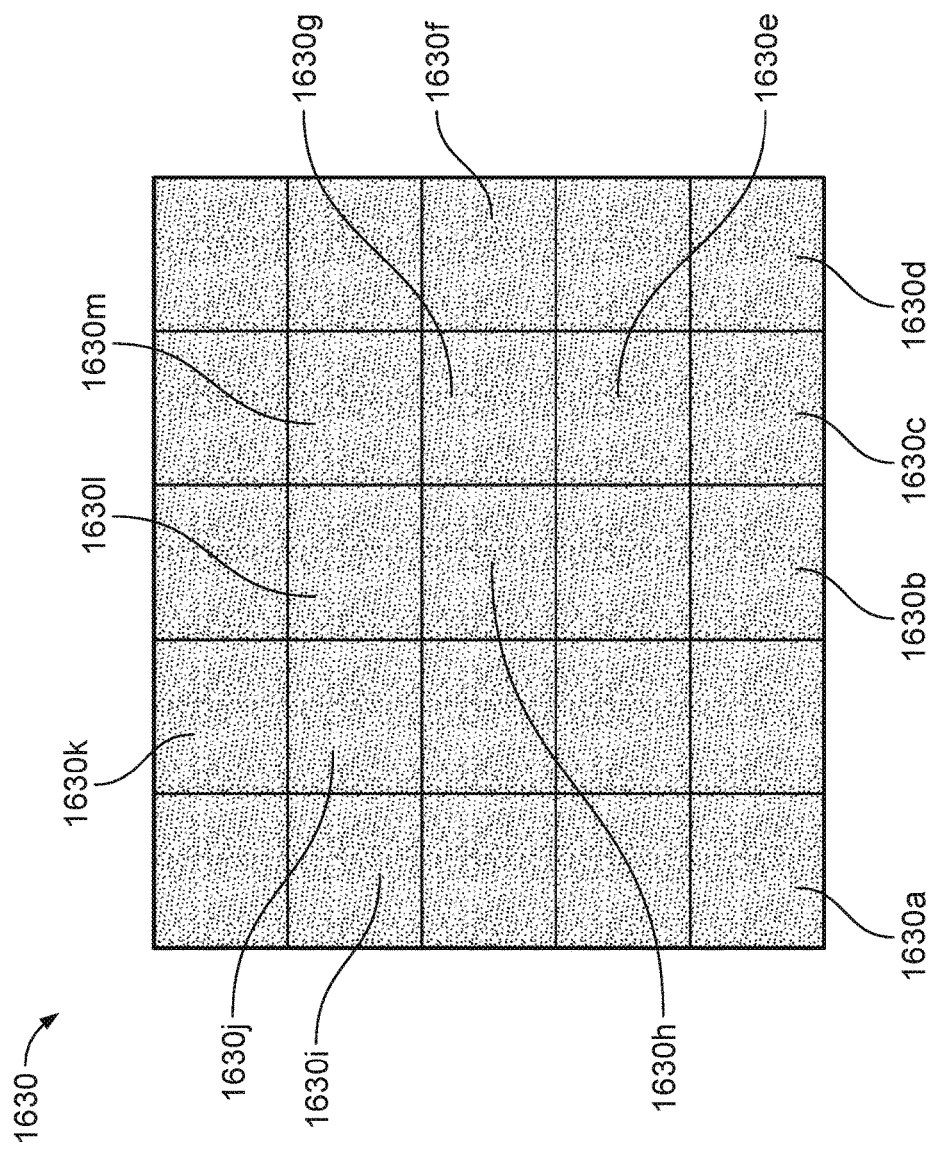

FIGS. 16A-16C provide comparative examples of communications coverage using different cluster frequencies and shared cluster frequencies. FIG. 16A shows a target area 1600 in which desired regions are covered by groups of analog beams forming clusters, such as clusters 1602a, 1602b, 1602c, 1602d and 1602e; 1604a, 1604b, 1604c and 1604d; 1606a, 1606b and 1606c; and 1608a, 1608b and 1608c. Each square in FIG. 16A represents a cluster, with different shadings indicating one or more of different frequencies, polarizations or time hops used in the clusters. Clusters of similar shading therefore use the same frequency, polarization and time hop.

The circle 1610 represents the contour of the main lobe of the analog beams for the center cluster 1602e. Within each cluster area are hybrid beams, e.g., digital beams formed by combing the analog beams in the cluster, that fully fill the cluster area. As described previously, one or more hybrid beams within each cluster can have different frequency channels that are sub-bands of the combined frequency spectrum of the analog beams forming the cluster. Additionally, one or more hybrid beams within each cluster can have the same frequency channel that is a sub-band of the combined frequency spectrum of the analog beams forming the cluster. In some implementations, the hybrid beams in a cluster reuse the frequency spectrum available to the cluster.

As shown in FIG. 16A, in some implementations, communications coverage is provided by adjacent clusters that use one or more of different frequencies, polarizations or time hops to minimize interference in the neighboring clusters. For example, clusters 1606a, 1602c, 1604b and 1608b are adjacent clusters. Each of these clusters uses one or more of a different frequency, polarization or time hop than the adjacent clusters. Similarly, clusters 1604b and 1602d are adjacent clusters and therefore each of them uses one or more of a different frequency, polarization or time hop than the other cluster.

Non-adjacent clusters, however, can use the same frequency, polarization and time hop since they do not interfere with one another. For example, as shown, clusters 1602c and 1602d are non-adjacent clusters, while clusters 1602c and 1604b, and 1604b and 1602d, are pairs of adjacent clusters.

Therefore, 1602c and 1602d share the same frequency, polarization and time hop. However, cluster 1604b has one or more of frequency, polarization or time hop different from clusters 1602c and 1602d.

The approach of providing coverage shown in FIG. 16A—adjacent clusters having one or more of frequency, polarization or time hop different, while non-adjacent clusters can share the same frequency, polarization or time hop—is used when beamforming with just the analog beams associated with each cluster, e.g., analog beams centered over the cluster area. This is the case, for example, when analog beam 1610 is used for hybrid beamforming in cluster 1602e, but not used for hybrid beamforming in other clusters.

The overlapping main lobes of different neighboring clusters use one or more of different frequencies, polarizations or time hops to avoid interference. However, clusters that are outside the main lobe of the center cluster can reuse the same frequency as the main lobe of the center cluster. Interference is controlled by adjusting the side lobes of the analog beams using complex coefficients (e.g. a phase or amplitude taper).

As an illustrative example, FIG. 16B shows a schematic diagram of analog beam lobes 1622a, 1624a and 1626a in neighboring clusters 1622, 1624 and 1626, respectively. Cluster 1622 is a center cluster of digital beams, and beam lobe 1622a is the main analog beam lobe of the center cluster 1622. Cluster 1624 is adjacent to the center cluster 1622. Lobe 1624a, which is the main analog beam lobe in the cluster 1624, uses one or more of a different frequency, polarization or time hop than the main beam lobe 1622a in the neighboring cluster to avoid interference. Cluster 1626 neighbors cluster 1624, but is non-adjacent with the center cluster 1622. Analog beamforming used to reduce side lobes and allow for sharing of parameters with center cluster. Accordingly, lobe 1626a, which is the main analog beam lobe in the cluster 1626, can share frequency spectrum, time hops and polarization with the beam lobe 1622a in the center cluster 1622.

In some implementations, communications coverage is provided by clusters in which a plurality of adjacent clusters use the same frequency, polarization and time hop. For example, FIG. 16C shows a target area 1630 in which clusters corresponding to the coverage regions, e.g., clusters 1630a, 1630b, 1630c, 1630d, 1630e, 1630f, 1630g, 1630h, 1630i, 1630j, 1630k, 1630l and 1630m, among others, share the frequency, polarization and time hop. In some implementations, the clusters corresponding to all the coverage regions in the target area 1630 use the frequency, polarization and time hop. In some implementations, a subset of the clusters corresponding to all the coverage regions in the target area 1630 use the frequency, polarization and time hop.

In the target area 1630, a cluster that shares the same frequency, polarization and time hop with neighboring clusters generates hybrid beams using analog beams corresponding to the cluster itself, and also using analog beams of one or more neighboring cluster(s). For example, as shown, cluster 1630c shares the same frequency, polarization and time hop with clusters 1630b and 1630d. Cluster 1630c forms digital beams by combining analog beams corresponding to cluster 1630c, and including analog beams corresponding to one or more of clusters 1630b and 1630d. This is similar to the hybrid beam forming described with respect to clusters 1502 and 1504. The interference of distant clusters is controlled by adjusting the side lobes of the analog beams using complex coefficients.

Within each cluster area digital beams fully fill the area. The digital beams within each cluster can have different frequency channels that reuse the frequency spectrum of the underlying analog beams, e.g., frequency spectrum shared by analog beams of the same cluster and neighboring cluster(s).

The approach of providing communications coverage using adjacent clusters sharing frequency, polarization and time hop, as described with respect to FIG. 16C, enables reuse of a greater frequency spectrum, e.g., combination of the frequency spectra of analog beams assigned to neighboring clusters, compared to providing communications coverage using adjacent clusters with different frequencies, polarizations or time hops, as described with respect to FIGS. 16A and 16B. However, the former option—shared frequencies between adjacent clusters—require more digital processing, since the hybrid beamformer processing circuitry has to process more analog beams to generate each digital beam.

Figure 17:
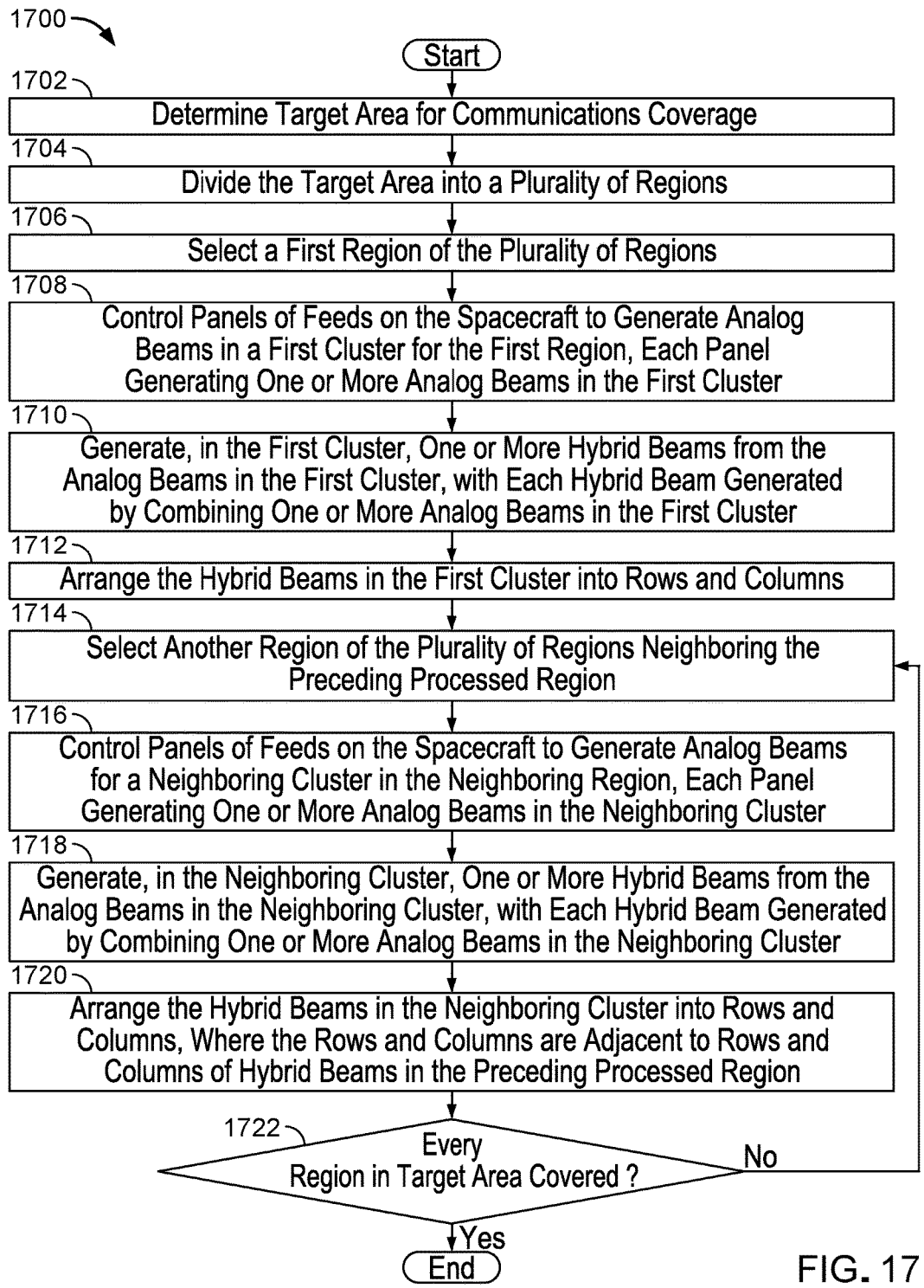
FIG. 17 illustrates an example of a process for providing communications coverage to a plurality of regions a target area using hybrid beamforming.

FIG. 17 illustrates an example of a process 1700 for providing communications coverage to a plurality of regions a target area using hybrid beamforming. In some implementations, the process 1700 is performed by hybrid beamformer processing circuitry in a spacecraft, e.g., by hybrid beamformer processing circuitry 302, which includes one or more analog beamformer processors 304a, 304b, 304c and 304d, and one or more digital beamformer processors such as 306. As described previously, in some implementations, the spacecraft is an orbiting satellite, such as the satellite 105. Accordingly, the following section describes the process 1700 with respect to the hybrid beamformer processing circuitry 302. However, the process 1700 also can be performed by other processing circuitry configurations, and/or by other types of spacecraft.

In some implementations, the hybrid beamformer processing circuitry 302 executes one or more instructions to perform the process 1700. These instructions are stored in memory, e.g., flash memory, hard disk or some other suitable memory, which is coupled to the hybrid beamformer on board the spacecraft. Alternatively, in some implementations, the instructions are sent to the hybrid beamformer on board the spacecraft from ground stations, e.g., through satellite gateway 110 or 125.

The process 1700 starts at 1702, in which a target area for communications coverage is determined. For example, the hybrid beamformer processing circuitry 302 determines an area on the Earth's surface for communications coverage, such as a target area shown with respect to FIGS. 14A-14E. In some implementations, information about the target area, e.g., coordinates of the area, are sent to the hybrid beamformer on board the spacecraft, e.g., as part of telecommunications commands from ground stations to the satellite 105 via the satellite gateways 110 or 125.

At 1704, the hybrid beamformer divides the target area into a plurality of regions. For example, the hybrid beamformer processing circuitry 302 divides the target area into a plurality of regions. In some implementations, the plurality of regions includes regions corresponding to the clusters 1420 and 1440.

At 1706, the hybrid beamformer selects a first region of the plurality of regions. For example, the hybrid beamformer 302 selects the region shown in FIG. 14A.

At 1708, the hybrid beamformer controls panels of feeds on the spacecraft to generate analog beams in a first cluster for the first region, each panel generating one or more analog beams in the first cluster. For example, the hybrid beamformer 302 controls the analog beamformers 304a, 304b, 304c and 340d to generate a plurality of analog beams for the selected region, such as analog beams 1410a, 1410b and 1410c, among others, thereby forming a cluster 1420.

In some implementations, the hybrid beamformer 302 generates one or more analog beams from each analog beamformer 304a, 304b, 304c and 340d. In other implementations, the hybrid beamformer 302 generates one or more analog beams from a subset of the analog beamformers 304a, 304b, 304c and 340d.

At 1710, the hybrid beamformer generates, in the first cluster, one or more hybrid beams from the analog beams in the first cluster, with each hybrid beam generated by combining one or more analog beams in the first cluster. For example, as described with respect to FIG. 14B, the hybrid beamformer 302 generates hybrid beams in the cluster 1420. As noted previously, a hybrid beam is a digital beam that is generated by combining one or more analog beams in a cluster.

At 1712, the hybrid beam arranges the hybrid beams in the first cluster into rows and columns. For example, the hybrid beamformer 302 arranges the hybrid beams in the cluster 1420 into one or more rows, e.g., rows 1420a, 1420b, 1420c, and one or more columns, e.g., columns 1430a, 1430b and 1430c. The hybrid beams are arranged into rows and columns such that the dimensions of each row and each column are within preselected limits that are selected to reduce the effect of side lobes, as described with respect to FIG. 14B.

At 1714, the hybrid beamformer selects another region of the plurality of regions neighboring the preceding processed region. For example, after generating the cluster 1420 of hybrid beams, the hybrid beamformer 302 selects the region neighboring the region covered by the cluster 1420, as described with respect to FIG. 14C.

At 1716, the hybrid beamformer controls panels of feeds on the spacecraft to generate analog beams for a neighboring cluster in the neighboring region, each panel generating one or more analog beams in the neighboring cluster. For example, the hybrid beamformer 302 controls the analog beamformers 304a, 304b, 304c and 340d to generate a plurality of analog beams, such as analog beams 1440a, 1440b and 1440c, among others, for the neighboring region, thereby forming the cluster 1440.

In some implementations, the hybrid beamformer 302 generates one or more analog beams corresponding to the cluster 1440 from each analog beamformer 304a, 304b, 304c and 340d. In other implementations, the hybrid beamformer 302 generates one or more of these analog beams from a subset of the analog beamformers 304a, 304b, 304c and 340d.

In some implementations, the one ore more analog beams generated in the neighboring cluster use one or more of different frequencies, time hops or polarizations than the one or more analog beams generated in the first cluster, to avoid interference between adjacent clusters. This is the case, for example, as described with respect to FIGS. 16A and 16B.

In some implementations, the one ore more analog beams generated in the neighboring cluster use the same frequency, time hop and polarizations as the one or more analog beams generated in the first cluster, thereby reducing the negative impact of side lobes to be within an acceptable range. This is the case, for example, as described with respect to FIG. 16C.

At 1718, the hybrid beamformer generates, in the neighboring cluster, one or more hybrid beams from the analog beams in the neighboring cluster, with each hybrid beam generated by combining one or more analog beams in the neighboring cluster. For example, as described with respect to FIG. 14D, the hybrid beamformer 302 generates hybrid beams in the cluster 1440.

At 1720, the hybrid beamformer arranges the hybrid beams in the neighboring cluster into rows and columns, where the rows and columns are adjacent to rows and columns of hybrid beams in the preceding processed region. For example, the hybrid beamformer 302 arranges the hybrid beams in the cluster 1440 into rows and columns as shown with respect to FIG. 14B. As in other clusters, the hybrid beams are arranged into rows and columns such that the dimensions of each row and each column are within preselected limits that are selected to reduce the effect of side lobes.

At 1722, the hybrid beamformer checks whether every region in the target area is covered. For example, after generating the cluster 1420 of hybrid beams, the hybrid beamformer 302 checks whether all the desired regions in the target area have been covered by clusters of hybrid beams. Upon determining that the adjacent region (e.g., corresponding to cluster 1440) have not been covered, the hybrid beamformer 302 generates the cluster 1440 of digital beams as described above. Similarly, after generating the cluster 1440 of hybrid beams (and after generating a cluster for every desired region) the hybrid beamformer 302 checks whether all the desired regions in the target area have been covered by clusters of hybrid beams.

If the hybrid beamformer determines that all regions have not yet been covered, then the hybrid beamformer selects each uncovered region and generates a cluster for the selected region, as described with respect to 1714-1720. For example, after generating the cluster 1440, the hybrid beamformer 302 determines that a third region above the cluster 1420 is remaining. As such, the hybrid beamformer generates the cluster 1450 of hybrid beams, as described with respect to FIG. 14E.

When the hybrid beamformer determines, at 1722, that all regions have been covered, then the process 1700 ends. Accordingly, in the above manner, the hybrid beamformer processing circuitry 302 provides communications coverage to all desired regions in a target area by hybrid beamforming.

Figure 18:
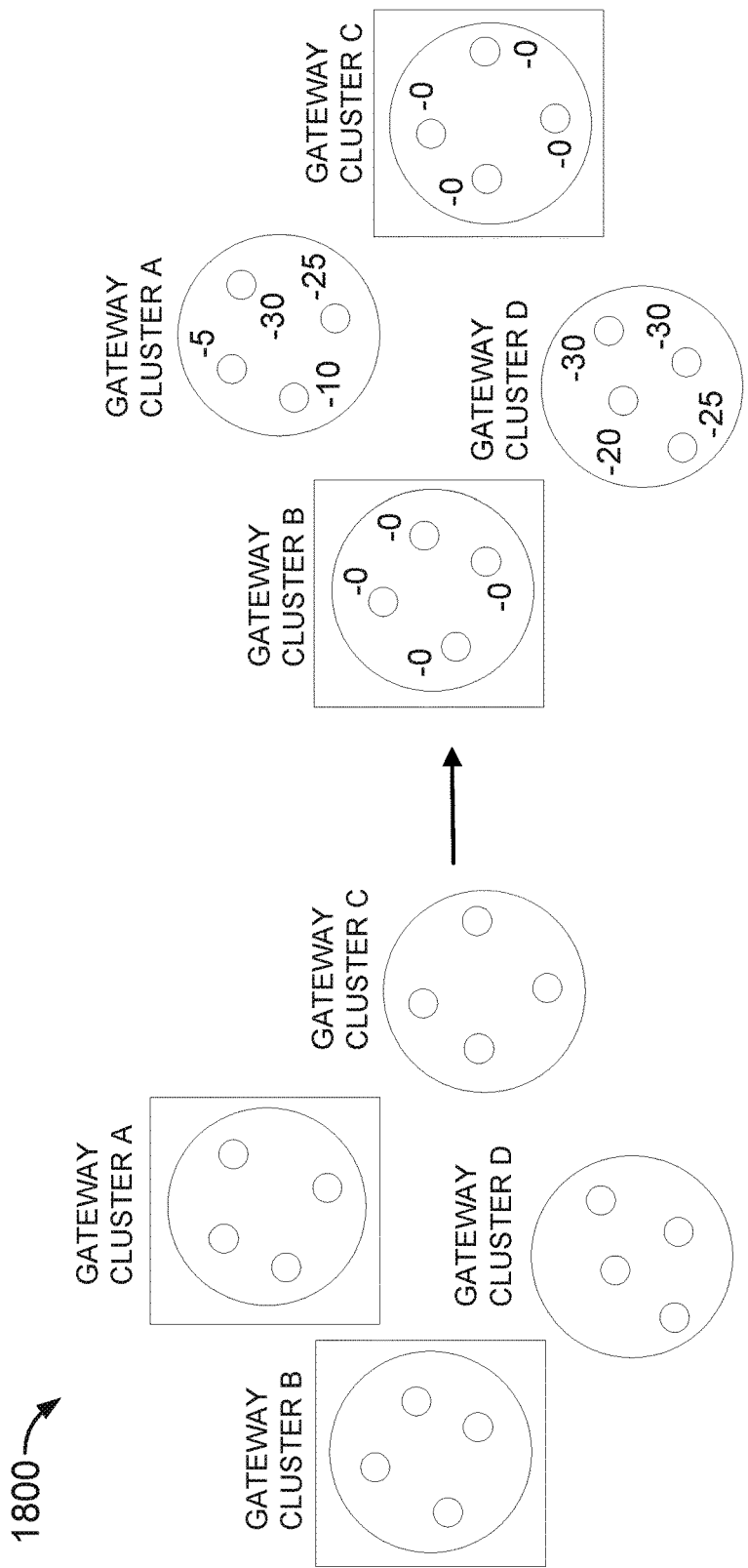
FIG. 18 illustrates an example of hybrid beamforming rain fade mitigation.

FIG. 18 illustrates an example 1800 of hybrid beamforming rain fade mitigation. The example 1800 shows how gateways may be formed into various gateway clusters. For example, example 1800 shows Gateway Clusters A-D, each with their own set of four gateways. A gateway cluster may be a set of gateways for which analog beams may be combined to form digital beams. For example, each of the four gateways in Gateway Cluster A may have a separate analog beam between the gateway and the satellite, and the analog beams may overlap and provide corresponding digital beams.

The gateways in each cluster may be located geographically proximate from one another. For example, the gateways in each cluster may be located within one hundred miles of one another. While four gateways are shown in each of the gateway clusters of FIG. 18, additional or fewer gateways may be included in gateway clusters. For example, a first gateway cluster may include two gateways, a second gateway cluster may include four gateways, and a third gateway cluster may include eight gateways.

The gateway clusters may provide all the data capacity for customers. For example, a satellite may provide data to the Gateway Clusters A and B, and the Gateway Clusters A and B may then provide data to hundreds of customers. Accordingly, ensuring that the Gateway Clusters have high data capacity with a satellite may be important.

As discussed above, rain fade may interfere with transmissions between a satellite and terrestrial gateways. For example, a thunderstorm above a terrestrial gateway may temporarily interfere with transmissions between the terrestrial gateway and the satellite. Certain types of communications may be particularly sensitive to rain fade. For example, V-band or Improved Ka-Band may be essentially unusable with a terrestrial gateway while it is raining at the location of the terrestrial gateway.

As shown in FIG. 18, initially Gateway Clusters A and B may actively be in communication with a satellite to transfer data between the gateways of the Gateway Clusters A and B and the satellite. Gateway Clusters C and D may be spare Gateway Clusters that may be activated to communicate with the satellite as needed. For example, if Gateway Clusters A and D both experience high rain fade, Gateway Cluster A may cease being used to communicate with the satellite and Gateway Cluster C may be used instead. Accordingly, sufficient data capacity to customers may be maintained even when rain fade is present.

Selection of the gateway clusters to use may be complicated by the fact that each gateway within a gateway cluster may experience a different amount of rain fade than another gateway within the same. For example, a first gateway in a gateway cluster may experience rain fade that attenuates signals between the satellite by −30 dBW and a second gateway in the gateway cluster may experience rain fade that attenuates signals between the satellite by −5 dBW, and for a different gateway cluster a first gateway may experience rain fade that attenuates signals between the satellite by −15 dBW and a second gateway in the gateway cluster may experience rain fade that attenuates signals between the satellite by −15 dBW. Accordingly, various factors may go into the selection of the gateway clusters to use based on rain fade.

Figure 19:
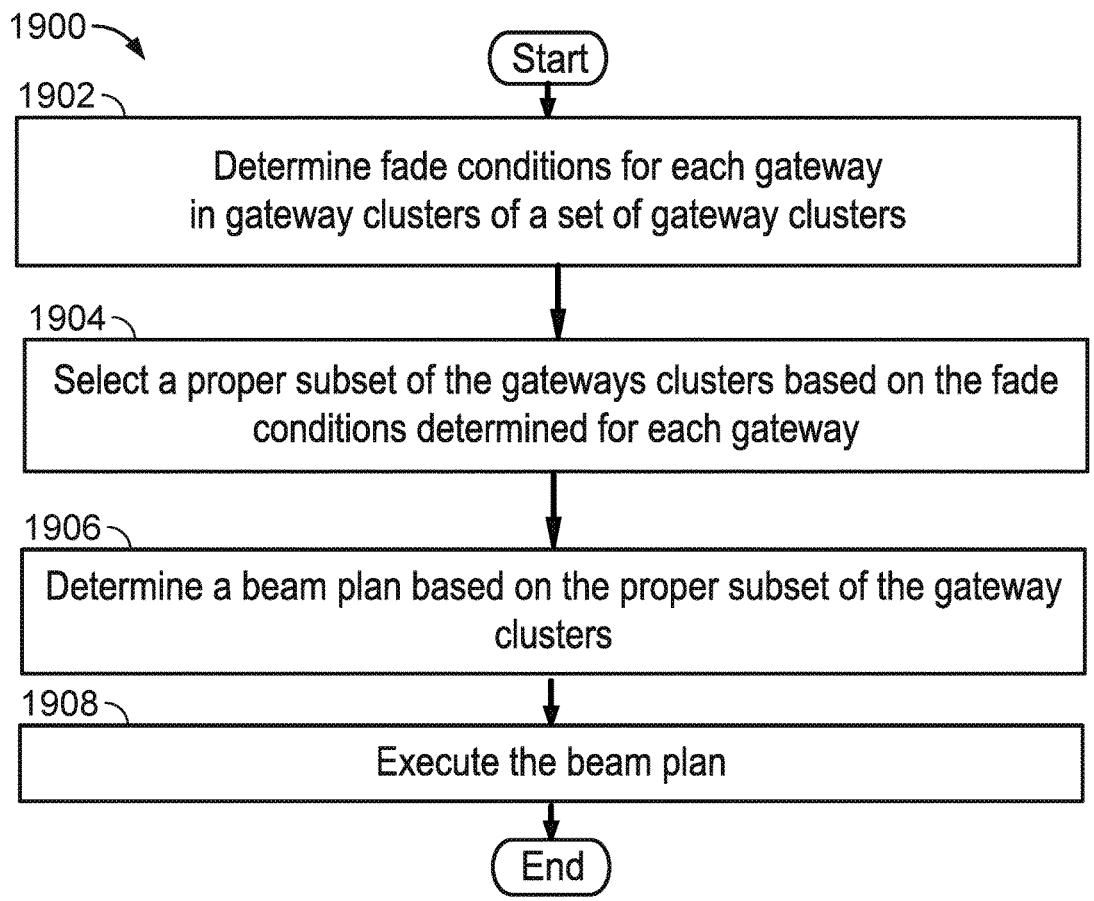
FIG. 19 illustrates an example of a process for hybrid beamforming rain fade mitigation.

FIG. 19 illustrates an example of a process 1900 for hybrid beamforming rain fade mitigation. In some implementations, the process 1900 is performed by hybrid beamformer processing circuitry in a spacecraft, e.g., by the spacecraft hybrid beamformer processing circuitry 302, which includes one or more analog beamformer processors 304a, 304b, 304c and 304d, and one or more digital beamformer processors such as 306. As described previously, in some implementations, the spacecraft is an orbiting satellite, such as the satellite 105. Accordingly, the following section describes the process 1900 with respect to the spacecraft hybrid beamformer processing circuitry 302. However, the process 1900 also can be performed by other processing circuitry configurations, and/or by other types of spacecraft or by a central operations center.

In some implementations, the hybrid beamformer processing circuitry, referred to henceforth interchangeably either as hybrid beamformer or processing circuitry, executes one or more instructions to perform the process 1900. These instructions are stored in memory, e.g., flash memory, hard disk or some other suitable memory, which is coupled to the hybrid beamformer on board the spacecraft. Alternatively, in some implementations, the instructions are sent to the hybrid beamformer on board the spacecraft from the ground, e.g., through satellite gateway 110 or 125.

The process 1900 starts at 1902, in which fade conditions are determined for each gateway in gateway clusters of a set of gateway clusters. For example, the satellite 105 may determine that there is no rain fade at any of the gateways for Gateway Clusters B and C, for Gateway Cluster A the gateways are experiencing rain fade that attenuates signals between the gateways and the satellites by −5 dBW, −30 dBW, −10 dBW, and −25 dbW, respectively, and for Gateway Cluster D the gateways are experiencing rain fade that attenuates signals between the gateways and the satellites by −20 dBW, −30 dBW, −25 dBW, and −30 dbW, respectively.

In some implementations, determining fade conditions for each gateway in gateway clusters of a set of gateway clusters may include determining a strength of signals between each gateway and the satellite and determining the fade conditions from the strength of the signals. For example, the fade conditions for each gateway may be determined by having each gateway constantly sending signals that include a unique tone or code word to the satellite 105. The satellite 105 may include a wide-band antenna that detects each of the signals from the gateways, determines which signals come from which gateways based on the unique tones or code words, and then determines the fade condition from the strength of the signal. For example, the signals may all be transmitted at a known power and the satellite 105 may determine the relative fade between gateways based on the difference between the known power and the power as detected by the wide-band antenna. For gateways that are actively providing data, the signal for determining the fade conditions may be transmitted in parallel with signals for data.

Additionally or alternatively, the satellite 105 may transmit wide band broadcasts that includes a tone or unique codeword that is received by all the gateways and each gateway may similarly determine an amount of fade from the strength of the received signal. The gateways may then transmit this information to a central operations center. Additionally or alternatively, the satellite may transmit a tone or unique cord word separately across various beams.

In some implementations, gateways in each gateway cluster are operable to form an analog beam with a satellite where at least some of the analog beams in each gateway cluster at least partially overlap and can be combined to form a digital beam. For example, all four gateways may have corresponding analog beams where the analog beams may be combined to form a single digital beam.

At 1904, a proper subset of the gateways clusters are selected based on the fade conditions determined for each gateway. For example, the satellite 105 or the central operations center may determine that the gateways in Gateway Clusters B and C are not experiencing fade and the gateways in Gateway Clusters A and D are and, in response, select the Gateways Clusters B and C. In some implementations, In some implementations, selecting a proper subset of the gateway clusters based on the fade conditions determined for each gateway includes determining an aggregate data capacity for each of the gateway clusters based on the fade conditions and selecting the gateway clusters with aggregate data capacities that are the highest out of the set of gateway clusters. For example, the satellite 105 or the central operations center may determine, based on the fade conditions, that the aggregate data capacity for Gateway Cluster B is highest followed by Gateway Cluster C, then Gateway Cluster A, and then Gateway Cluster D and, in response, select Gateway Clusters B and C as those Gateway Clusters are the two Gateway Clusters with the highest aggregate data capacities.

In some implementations, selecting a proper subset of the gateway clusters based on the fade conditions determined for each gateway includes determining a number of gateways that satisfies a fade threshold for each gateway cluster and selecting the gateway clusters with the most number of gateways in the gateway cluster that satisfy the fade threshold. For example, the satellite 105 or the central operations center may have specified a fade threshold of −20 dBW, determine that Gateway Clusters B and C each have four gateways that have fade conditions less than that threshold, determine that Gateway Cluster A has two gateways that have fade conditions less than that threshold, determine that Gateway Cluster D has no gateways less than that threshold, and, in response, select Gateway Clusters B and C as those gateway clusters are the two gateways with the most gateways that satisfy the fade threshold.

In some implementations, selecting a proper subset of the gateway clusters based on the fade conditions determined for each gateway includes not selecting a gateway cluster in the set of gateway clusters for inclusion in the proper subset, where the gateway cluster that is not selected is currently being used to transmit data with a satellite and selecting a gateway cluster in the set of gateway clusters for inclusion in the proper subset, where the gateway cluster that is selected is not currently being used to transmit data with a satellite. For example, Gateways Clusters A and B may be currently transferring data for customers between the satellite and gateways while Gateway Clusters C and D are not, and the satellite 105 or central operations center may then select Gateway Clusters B and C, and not select Gateway Clusters A and D.

While 1904 has been described with examples of selecting two gateway clusters out of a set of four gateway clusters, other numbers of gateways clusters may be used. For example, six out of a set of eight gateway clusters may be selected or seven out of a set of ten gateway clusters selected.

At 1906, a beam plan is determined for the proper subset of the gateway clusters. For example, the satellite 105 or the central operations center may determine a beam plan that includes beam coefficients for each of the gateways in the selected gateway clusters. The beam plan may specify which gateway channels will be mapped to each beam.

At 1908, the beam plan is executed. For example, the satellite 105 may transmit the beam plan to the gateways where the satellite 105 generates the beam plan, or where the central operations center generates the beam plan the center may transmit the beam plan to the gateways and to the satellite 105. In some implementations, the beam plan may specify an activation time. For example, the beam plan may specify that the beam plan be used for transmissions in one second from a current time.

In some implementations, multiple satellites may be used instead of a single satellite 105.

The process 1900 is described above as being able to be performed by a satellite or a central operations center. Performing the process 1900 by the satellite may have advantages over performing the process 1900 by the central operations center as the central operations center may need to have separate communication links with each of the gateways to receive information regarding fade and transmit beam plans to the gateways. Performing the process 1900 by the central operations center may have advantages over performing the process 1900 by the central operations center as the satellite 105 may have more limited processing or power, and fixing problems on the satellite 105 may be more difficult.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method comprising:
   determining fade conditions for one or more gateways in gateway clusters of a set of gateway clusters;
   selecting a proper subset of the gateway clusters based on the fade conditions determined for the one or more gateways, wherein selecting the proper subset of the gateway clusters comprises:
      deselecting a first gateway cluster of the set of gateway clusters that is currently active in data transmission with a satellite, the first gateway cluster including a plurality of gateways, and
      selecting a second gateway cluster of the set of gateway clusters for inclusion in the proper subset, wherein the second gateway cluster is currently inactive for data transmission with the satellite, the second gateway cluster including a plurality of gateways;
   determining a beam plan based on the proper subset of the gateway clusters; and
   executing the beam plan.

2. The method of claim 1, wherein the gateways in a gateway cluster are operable to form an analog beam with a satellite, wherein at least some of the analog beams in a gateway cluster at least partially overlap and combine to form a digital beam.

3. The method of claim 1, wherein selecting a proper subset of the gateway clusters based on the fade conditions determined for the one or more gateways comprises:
   determining an aggregate data capacity for at least a plurality of the gateway clusters based on the fade conditions; and selecting the gateway clusters with aggregate data capacities that are the highest out of the set of gateway clusters.

4. The method of claim 1, wherein selecting a proper subset of the gateway clusters based on the fade conditions determined for each gateway comprises:
   determining, for each of at least a plurality of the gateway clusters, a number of included gateways that satisfies a fade threshold; and
   selecting the gateway clusters with the most number of included gateways that satisfy the fade threshold.

5. The method of claim 1, wherein determining fade conditions for the one or more gateways in the gateway clusters of the set of gateway clusters comprises:
   determining a strength of signals between each gateway of the one or more gateways and the satellite; and
   determining the fade conditions from the strength of the signals.

6. The method of claim 1, wherein determining a beam plan based on the proper subset of the gateway clusters comprises:
   determining beamforming coefficients for each of the gateways in the proper subset of the gateway clusters based on the gateways in the proper subset of the gateway clusters.

7. The method of claim 1, wherein executing the beam plan comprises:
   providing the beam plan to the gateways in the proper subset of the gateway clusters from a satellite that is in communication with the set of gateway clusters.

8. The method of claim 1, wherein selecting a proper subset of the gateway clusters based on the fade conditions determined for the one or more gateways is performed by a satellite.

9. The method of claim 1, wherein selecting a proper subset of the gateway clusters based on the fade conditions determined for the one or more gateways is performed by a central operations center.

10. The method of claim 1, wherein the set of gateway clusters includes a first plurality of active gateway clusters that are currently communicating with the satellite, the first plurality including the first gateway cluster, and a second plurality of spare gateway clusters that are not currently communicating with the satellite, the second plurality including the second gateway cluster, and
   wherein the second gateway cluster is selected as a replacement for the first gateway cluster for communicating with the satellite.

11. The method of claim 1, wherein determining fade conditions for the one or more gateways in the gateway clusters comprises, for a gateway cluster, controlling one or more gateways in the cluster to transmit a signal to a satellite, the signal transmitted at a known power and including a unique tone or code word identifying the corresponding gateway, and
   wherein the method further comprises:
      identifying, by the satellite, the gateways corresponding to received signals using the unique tones or code words; and
      determining, by the satellite, relative fades with the gateways by computing a difference between the known power and signal power detected by the satellite.

12. The method of claim 1, wherein determining fade conditions for the one or more gateways in the gateway clusters comprises, for a gateway cluster, controlling a satellite to transmit a signal to each of one or more gateways in the gateway cluster, the signal transmitted at a known power and including a unique tone or code word corresponding to the gateway, and
   wherein the method further comprises, for each of one or more gateways in a gateway cluster:
      determining a relative fade with the satellite by computing a the difference between the known power and signal power detected by the gateway; and
      transmitting information about the relative fade to a central operations center, the information including the unique tone or code word corresponding to the gateway.

13. A system comprising:
   a processor; and
   a non-transitory computer-readable medium storing instructions executable by the processor and, when executed, configured to cause the processor to perform operations comprising:
      determining fade conditions for one or more gateways in gateway clusters of a set of gateway clusters;
      selecting a proper subset of the gateway clusters based on the fade conditions determined for the one or more gateways, wherein selecting the proper subset of the gateway clusters comprises:
         deselecting a first gateway cluster of the set of gateway clusters that is currently active in data transmission with a satellite, the first gateway cluster including a plurality of gateways, and
         selecting a second gateway cluster of the set of gateway clusters for inclusion in the proper subset, wherein the second gateway cluster is currently inactive for data transmission with the satellite, the second gateway cluster including a plurality of gateways;
      determining a beam plan based on the proper subset of the gateway clusters; and
      executing the beam plan.

14. The system of claim 13, wherein the gateways in a gateway cluster are operable to form an analog beam with a satellite, wherein at least some of the analog beams in a gateway cluster at least partially overlap and combine to form a digital beam.

15. The system of claim 13, wherein selecting a proper subset of the gateway clusters based on the fade conditions determined for the one or more gateways comprises:
   determining an aggregate data capacity for at least a plurality of the gateway clusters based on the fade conditions; and
   selecting the gateway clusters with aggregate data capacities that are the highest out of the set of gateway clusters.

16. The system of claim 13, wherein selecting a proper subset of the gateway clusters based on the fade conditions determined for each gateway comprises:
   determining, for each of at least a plurality of the gateway clusters, a number of included gateways that satisfies a fade threshold; and
   selecting the gateway clusters with the most number of included gateways that satisfy the fade threshold.

17. The system of claim 13, wherein determining fade conditions for the one or more gateways in the gateway clusters of the set of gateway clusters comprises:
   determining a strength of signals between each gateway of the one or more gateways and the satellite; and
   determining the fade conditions from the strength of the signals.

18. The system of claim 13, wherein determining a beam plan based on the proper subset of the gateway clusters comprises:
   determining beamforming coefficients for each of the gateways in the proper subset of the gateway clusters based on the gateways in the proper subset of the gateway clusters.

19. The system of claim 13, wherein executing the beam plan comprises:
   providing the beam plan to the gateways in the proper subset of the gateway clusters from a satellite that is in communication with the set of gateway clusters.

20. The system of claim 13, wherein selecting a proper subset of the gateway clusters based on the fade conditions determined for the one or more gateways is performed by a satellite.

21. The system of claim 13, wherein the set of gateway clusters includes a first plurality of active gateway clusters that are currently communicating with the satellite, the first plurality including the first gateway cluster, and a second plurality of spare gateway clusters that are not currently communicating with the satellite, the second plurality including the second gateway cluster, and
   wherein the second gateway cluster is selected as a replacement for the first gateway cluster for communicating with the satellite.

22. The system of claim 13, wherein determining fade conditions for the one or more gateways in the gateway clusters comprises, for a gateway cluster, controlling one or more gateways in the cluster to transmit a signal to a satellite, the signal transmitted at a known power and including a unique tone or code word identifying the corresponding gateway, and
   wherein the operations further comprise:
      identifying, by the satellite, the gateways corresponding to received signals using the unique tones or code words; and
      determining, by the satellite, relative fades with the gateways by computing a difference between the known power and signal power detected by the satellite.

23. The system of claim 13, wherein determining fade conditions for the one or more gateways in the gateway clusters comprises, for a gateway cluster, controlling a satellite to transmit a signal to each of one or more gateways in the gateway cluster, the signal transmitted at a known power and including a unique tone or code word corresponding to the gateway, and
   wherein the operations further comprise, for each of one or more gateways in a gateway cluster:
      determining a relative fade with the satellite by computing a the difference between the known power and signal power detected by the gateway; and
      transmitting information about the relative fade to a central operations center, the information including the unique tone or code word corresponding to the gateway.

24. A non-transitory computer-readable medium storing instructions executable by one or more processors and, when executed, configured to cause the one or more processors to perform operations comprising:
   determining fade conditions for one or more gateways in gateway clusters of a set of gateway clusters;
   selecting a proper subset of the gateway clusters based on the fade conditions determined for the one or more gateways, wherein selecting the proper subset of the gateway clusters comprises:
      deselecting a first gateway cluster of the set of gateway clusters that is currently active in data transmission with a satellite, the first gateway cluster including a plurality of gateways, and
      selecting a second gateway cluster of the set of gateway clusters for inclusion in the proper subset, wherein the second gateway cluster is currently inactive for data transmission with the satellite, the second gateway cluster including a plurality of gateways;
   determining a beam plan based on the proper subset of the gateway clusters; and
   executing the beam plan.

* * * * *

UNITED STATES PATENT AND TRADEMARK OFFICE
CERTIFICATE OF CORRECTION

PATENT NO. : 10,511,378 B2
APPLICATION NO. : 16/159125
DATED : December 17, 2019
INVENTOR(S) : Jeffrey Freedman et al.

Page 1 of 1

It is certified that error appears in the above-identified patent and that said Letters Patent is hereby corrected as shown below:

In the Claims

In Claim 12, Column 46, Line 7 (approx.), delete "a the" and insert -- the --, therefor.

In Claim 23, Column 48, Line 11 (approx.), delete "a the" and insert -- the --, therefor.

Signed and Sealed this
Fourth Day of February, 2020

Andrei Iancu
*Director of the United States Patent and Trademark Office*